US012812084B1

(12) United States Patent
Mui et al.

(10) Patent No.: US 12,812,084 B1
(45) Date of Patent: Nov. 24, 2026

(54) INTRINSIC EXTRINSIC CAMERA CALIBRATION

(71) Applicant: Northrop Grumman Systems Corporation, Falls Church, VA (US)

(72) Inventors: Peter H. Mui, Falls Church, VA (US); Sheng Xu, Falls Church, VA (US); Michael Helton, Falls Church, VA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 19/360,821

(22) Filed: Oct. 16, 2025

(51) Int. Cl.

| | |
|---|---|
| ***H04N 17/00*** | (2006.01) |
| ***G06T 7/80*** | (2017.01) |
| ***H04N 23/20*** | (2023.01) |
| ***H04N 23/56*** | (2023.01) |

(52) U.S. Cl.
CPC ............. *H04N 17/002* (2013.01); *G06T 7/80* (2017.01); *H04N 23/20* (2023.01); *H04N 23/56* (2023.01); *G06T 2207/10048* (2013.01); *G06T 2207/30244* (2013.01)

(58) Field of Classification Search
CPC ...... H04N 17/002; H04N 23/56; H04N 23/20; G06T 7/80; G06T 2207/10048; G06T 2207/30244
See application file for complete search history.

(56) References Cited

U.S. PATENT DOCUMENTS

| | | | | |
|---|---|---|---|---|
| 9,804,252 | B2 * | 10/2017 | Yagcioglu | H04N 17/002 |
| 2005/0238237 | A1 * | 10/2005 | Haeusler | G01B 11/2545 382/203 |
| 2016/0076892 | A1 * | 3/2016 | Zhou | G01C 21/20 701/3 |
| 2017/0172406 | A1 * | 6/2017 | Pamplona | G06F 1/163 |
| 2017/0372491 | A1 * | 12/2017 | Doganis | H04N 5/44504 |
| 2023/0199166 | A1 * | 6/2023 | Wang | G06T 1/0007 382/154 |
| 2023/0325000 | A1 * | 10/2023 | Vilkhovyi | G06F 3/017 345/156 |
| 2026/0011033 | A1 * | 1/2026 | Erdei | G06T 7/80 |

* cited by examiner

*Primary Examiner* — Sunghyoun Park

(74) *Attorney, Agent, or Firm* — John A. Miller; Shumaker, Loop & Kendrick, LLP

(57) ABSTRACT

Techniques for simultaneously determining one or more intrinsic calibration parameters and one or more extrinsic calibration parameters of a test camera based on a test image captured by the test camera and a reference image captured by a reference camera having a line of sight parallel to a vector normal to a reflective surface of an alignment cube coupled to the test camera.

20 Claims, 16 Drawing Sheets

100

INTRINSIC EXTRINSIC CAMERA CALIBRATION

BACKGROUND

Rendezvous and proximity operations (RPO) missions typically involve a service spacecraft autonomously approaching and operating in close proximity to a target vehicle in space. A crucial element to the success of RPO missions is accurate pose estimation of the client vehicle relative to the service spacecraft. Pose estimation involves determining the relative position and orientation of the target vehicle with respect to the service vehicle using a flight camera. This information is vital for the guidance, navigation, and control (GNC) of the service spacecraft, ensuring safe and efficient execution of RPO maneuvers. The flight camera is typically calibrated prior to launch during, for example, the integration and testing phase.

BRIEF DESCRIPTION OF THE DRAWINGS

The included drawings are for illustrative purposes and serve only to provide examples of possible structures and operations for the disclosed inventive systems, apparatus, methods, and computer program products. These drawings in no way limit any changes in form and detail that may be made by one skilled in the art without departing from the spirit and scope of the disclosed implementations.

Figure 1:
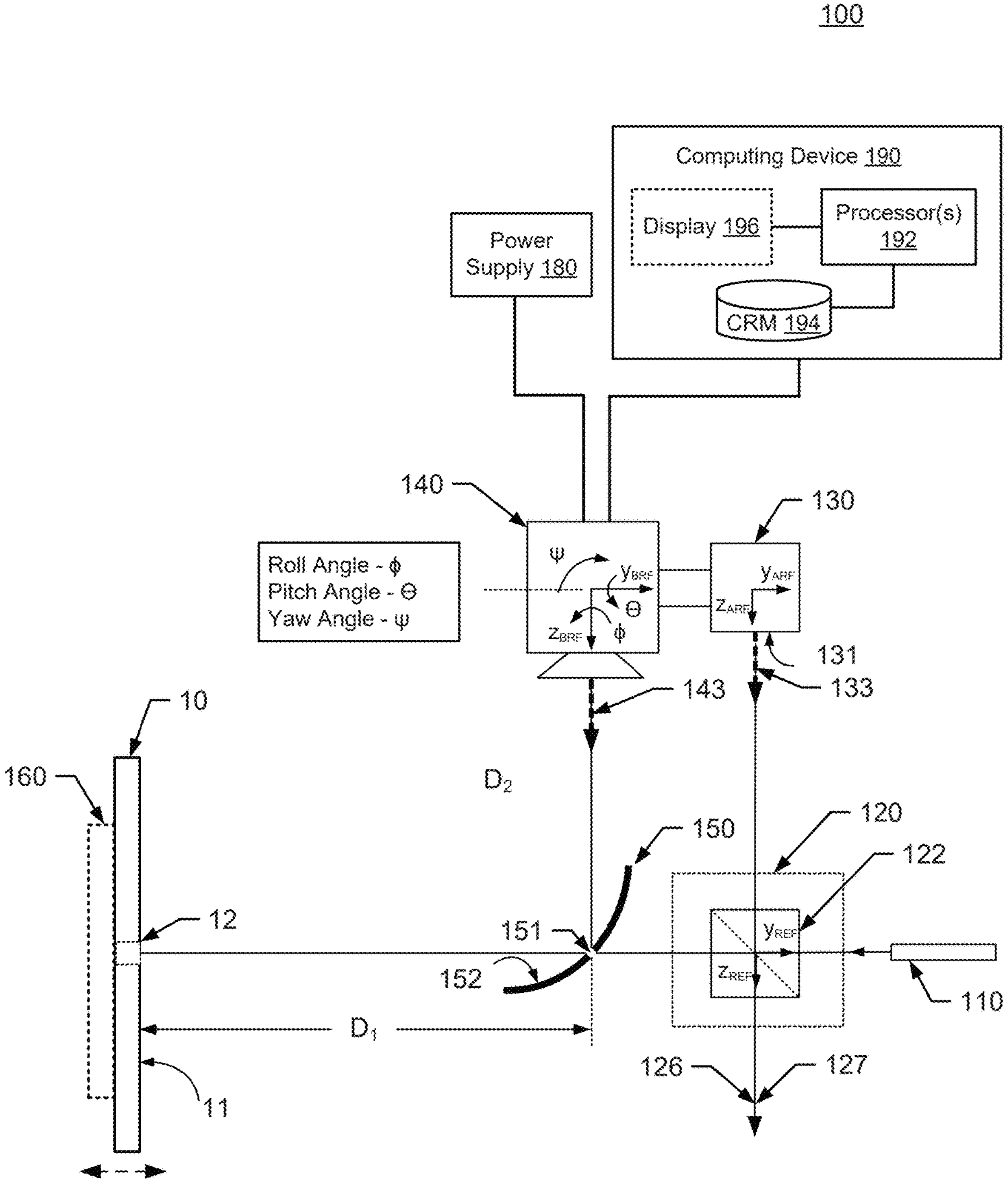
FIG. 1 is a schematic illustration depicting one example of components of a camera calibration system in accordance with various embodiments.

The figures and components therein may not be drawn to scale.

DETAILED DESCRIPTION

Different aspects are described below with reference to the accompanying drawings. In the following description, numerous specific details are set forth in order to provide a thorough understanding of the presented embodiments. The disclosed embodiments may be practiced without one or more of these specific details. In other instances, well-known operations have not been described in detail to avoid unnecessarily obscuring the disclosed embodiments. While the disclosed embodiments will be described in conjunction with the specific embodiments, it will be understood that it is not intended to limit the disclosed embodiments.

Often, flight cameras used in RPO missions have a nominal fixed focus distance between the camera sensor plane and the object being imaged of a range, such as between 100 m and 1000 m. To calibrate a flight camera with such a focus distance (e.g., greater than 100 m) using conventional techniques may require an impractically large and rigid calibration pattern and large laboratory room space so that the flight camera can observe the pattern focused and filling almost the entire field-of-view. Further, conventional techniques (e.g., autocollimators) for calibrating visible wavelength cameras do not determine extrinsic calibration parameters. Moreover, techniques for calibrating infrared cameras are not commercially available.

Certain techniques disclosed herein can determine intrinsic and extrinsic calibration parameters of a test (flight) camera at any focus distance by employing a parabolic mirror to focus/collimate light and reflect images of a calibration pattern board onto the camera imaging plane. The calibration pattern board can be translated to various distances from the parabolic mirror to simulate any desired virtual object distance in space. These techniques can be used to calibrate test cameras having focus distances of 100 meters or more using a conventionally-sized checkboard pattern in a standard laboratory setting or other relatively small space. In addition, these techniques can calibrate test cameras across various wavelength spectrums (e.g., visible light spectrum, infrared spectrum, ultraviolet spectrum, etc.) as no refractive element is involved. For example, these techniques can calibrate test cameras in a visible (VIS) spectrum between 0.38-0.75 μm, a near infrared (NIR) spectrum between 0.75 and 1.4 μm, a middle wavelength infrared (MWIR) spectrum between 3.0-5.0 μm, a long wavelength infrared (LWIR) spectrum between 8.0-14.0 μm, in an ultraviolet (UV) spectrum between 10 and 400 nm etc.

Certain techniques disclosed herein can simultaneously determine both intrinsic and extrinsic calibration parameters of a test camera by comparing information from two captured images of a calibration pattern board: a test image captured by the test camera and a reference image captured by a fully characterized reference camera oriented to have its line of sight (LOS) parallel to a reference vector of an alignment cube coupled to the test camera. Based on this alignment, the images captured by the reference camera and test camera can be informative of a transformation correspondence between the reference camera and the test camera. These techniques can determine intrinsic calibration parameters of the test camera such as focal length, coordinates of a principal point, and/or one or more distortion coefficients. These techniques can also determine extrinsic calibration parameters of the test camera such as a yaw angle, a pitch angle, and a roll angle. These techniques are robust against image distortions introduced by the parabolic mirror because these distortions are identically observed by both cameras. In some cases, these techniques also include an alignment procedure to align a normal reference vector at a reflective surface of the alignment cube with a frontside surface of the calibration pattern board. In some cases, the test camera being calibrated is an infrared camera (e.g., camera configured to capture images based on NIR spectrum, MWIR spectrum, LWIR spectrum, etc.). In some cases, the test camera being calibrated is a visible light camera. In some cases, the test camera being calibrated is an ultraviolet light camera. Test cameras of various wavelengths can be calibrated with these techniques. These techniques can provide the camera calibration parameters implemented in computer vision such as triangulation and pose tracking that are typically used in RPO missions.

In many instances, RPO missions require flight cameras to calculate a pose estimate that is accurate within 5% error from ground truth. For example, RPO satellites, such as Mission Extension Vehicles and Mission Robotic Vehicles, use a combination of LWIR and visible light cameras to estimate a six (6) degrees of freedom (DoF) pose of a client vehicle during approach. Having a pose estimate that is accurate to within an error of less than 5% can be important since the onboard guidance navigation and control takes the pose estimate to perform its state determination and waypoint generation. If the pose estimate is off by a predefined amount from ground truth, the built-in fault detection and correction system may be triggered, and the satellite is forced to retreat and perform a reattempt several days later. Certain techniques disclosed herein can be used to determine the intrinsic and extrinsic parameters of LWIR cameras and VIS cameras with such accuracy that enables the cameras to generate pose estimates within 5% error. In one implementation, techniques can be used to simultaneously measure intrinsic and extrinsic calibration parameters of stereo LWIR cameras and calibrate the stereo LWIR cameras such that the calibrated LWIR cameras can determine a pose estimate within 4% error of ground truth. These techniques may advantageously reduce the number of scrubbed docking attempts which can be costly and/or cause delays in the schedule. Generally speaking, these techniques may be advantageous to completing successful RPO missions.

Although various examples are discussed herein with reference to cameras used in space applications, the techniques are not so limited. For example, certain techniques disclosed herein can be used to characterize cameras used in other applications such as in 3D scanners and robotics.

Further, certain techniques disclosed herein determine each of the calibration parameters separately from the other calibration parameters. The calibration parameters have been decoupled. These techniques are advantageous over conventional calibration techniques that involve tightly coupled parameters and take multiple images with the camera at various distances and angles. For tightly coupled parameters, robust parameter reconstruction is difficult due to image noise, sampling rate, and uncertainty in scene state making it difficult to separate higher and lower order effects. Furthermore, geometric diversity of perspective is needed to ensure all the parameters are mathematically observable or solvable. Unfortunately, this can only be determined in the post data processing, after the data collect.

In various implementations, techniques involve calibration systems that allow for robust in-situ measurements across differing geometries (e.g., on benchtop, mounted on spacecraft, differing fields of view, etc.). The calibration system has a simple correspondence matching between the reference and test cameras that enables improved accuracy over conventional calibration systems having more complex setups.

I. Examples of Camera Calibration Systems

In various embodiments, a camera calibration system can simultaneously determine intrinsic and extrinsic calibration parameters for a test camera (sometimes referred to as a "first camera") based on a single test image captured by the test camera and a single reference image captured by a reference camera (sometimes referred to as a "second camera") positioned/oriented with its line of sight (LOS) vector parallel to a reference vector of an alignment cube attached to the test camera. The intrinsic calibration parameters (e.g., a focal length, principal point, and one or more distortion coefficients) and extrinsic calibration parameters (e.g., a pitch angle, a yaw angle, and a roll angle) of the test camera can be determined by comparing information derived from the test image and the reference image. The relative orientation and shift of the near-center centroids, where radial distortion is very small, of the test camera and the reference vector can be used to generate a transformation relationship between the test camera reference frame (BRF) and the alignment cube reference frame (ARF) for calibrating the test camera.

FIG. 1 is a schematic illustration depicting one example of components of a camera calibration system 100 in accordance with some embodiments. The camera calibration system 100 includes a laser source 110 configured to emit a light beam, an optical system 120, an alignment cube 130, a test (first) camera 140 attached to the alignment cube 130, and a parabolic mirror 150 configured to reflect light to the test camera 140. The test camera 140 is configured to capture at least one test image of the calibration pattern object 20 based on light reflected by the parabolic mirror 150. The illustration shows examples of light paths between components of the camera calibration system 100 during operation. The optical system 120 includes a beam splitter 122 (e.g., dichroic mirror) that can split a light beam from the laser source 110 into a first beam reflected to the alignment cube 130 and a second beam transmitted through a mirror hole 151 in the parabolic mirror 150 to the calibration pattern object 10. Light reflected by the alignment cube 130 may be transmitted through the beam splitter 122 as a first exit beam 126. The illustrated calibration pattern object 10 includes an alignment hole 12 at or near the center and an optional (denoted by dashed line) mirror 160 (e.g., flat mirror)

attached to a back-side surface opposing a first (front-side) surface 11. When the alignment hole 12 of the calibration pattern object 10 is not plugged by an opaque material (e.g., during alignment of the calibration pattern object 10), light from the second beam is reflected by the mirror 160 and transmitted through the mirror hole 151 to the beam splitter 122 and reflected as a second exit beam 127. The camera calibration system 100 also includes an $x_{REF}$ axis, a $y_{REF}$ axis, and a $z_{REF}$ axis (reference axes). The alignment cube 130 and first surface 11 of calibration pattern object 10 are perpendicular to a reference plane formed by the $x_{REF}$ axis and the $y_{REF}$ axis. The laser source 110 is positioned and oriented to direct the light beam along the $y_{REF}$ axis. The illustrated example shows the first exit beam 126 and second exit beam 127 coincide indicating that the reference vector 133 of alignment cube 130 and first surface 11 of calibration pattern object 10 are perpendicular to an optical path of the light beam from the laser source 110 and perpendicular to the reference plane.

During an alignment procedure, the alignment cube 130 coupled to the test camera 140 and the calibration pattern object 10 may be positioned/oriented until the first exit beam 126 and second exit beam 127 converge to coincide. When the alignment cube 130 and calibration pattern object 10 are in this aligned position/orientation, the plugged alignment hole 12 is centered on the mirror hole 151 in the image plane. After a test image of the calibration pattern object 10 is binarized/centroided, the image includes a dark spot that corresponds to the plugged alignment hole centered on the mirror hole 151 of the parabolic mirror. The centroid of the dark spot can be used as a reference to pair test centroids in the test image with reference centroids in a reference image taken by a reference camera (e.g., reference camera 240 in FIG. 2).

Figure 2:
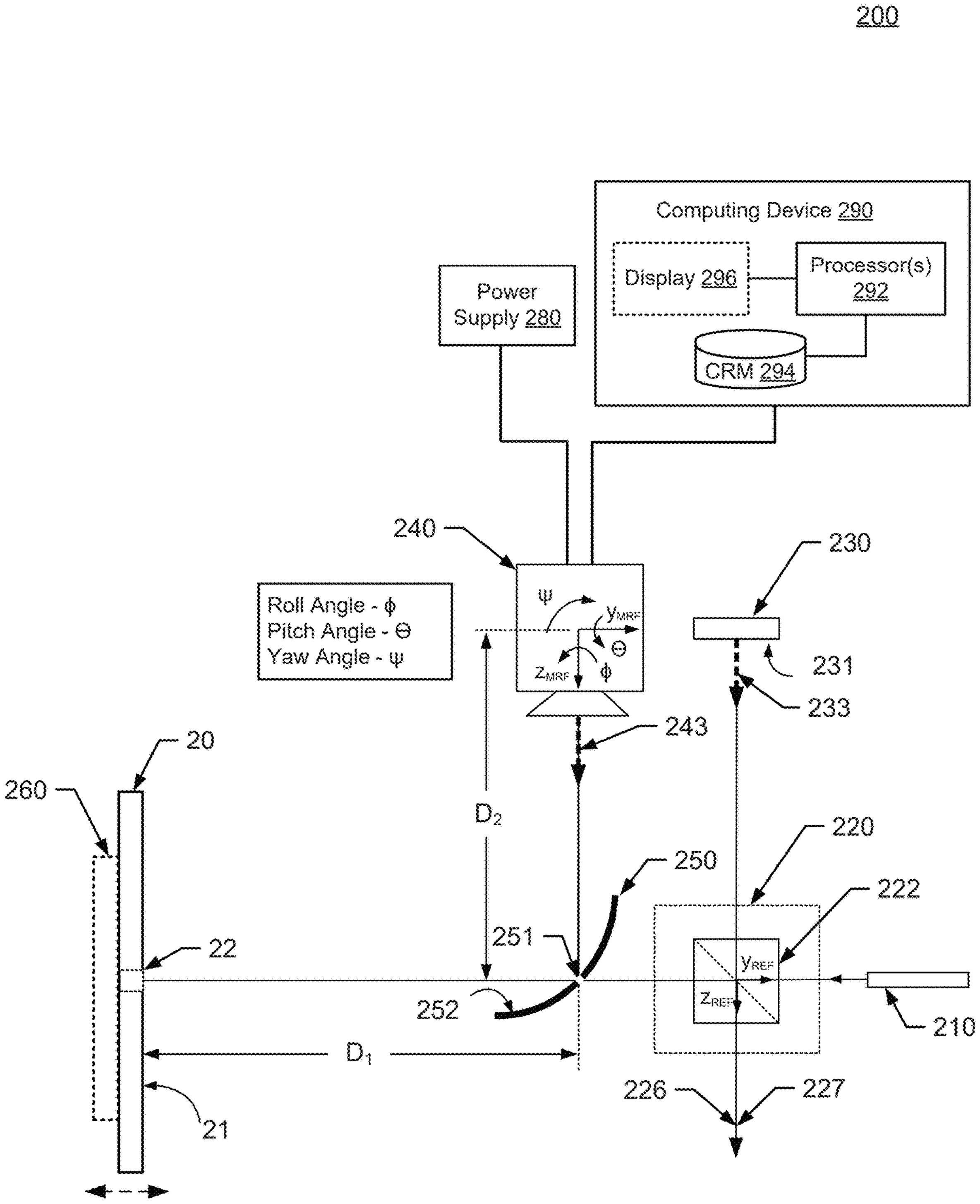
FIG. 2 is a schematic illustration depicting one example of components of a camera calibration system with a reference camera, in accordance with some embodiments.

The camera calibration system 100 can be used to simultaneously determine intrinsic and extrinsic calibration parameters of the test camera 140 using a test image captured by the test camera 140 and a reference image captured by a reference camera with a line of sight (LOS) vector that is parallel to a reference vector 133 of alignment cube 130 (e.g., reference camera 240 in FIG. 2 has a line of sight vector 243 that is parallel to a reference vector 233 of mirror 230 and reference vector 233 is aligned with the reference vector 133 of alignment cube 130). The reference vector 133 is perpendicular to reflective surface 131 of alignment cube 130. The reference camera orientation with respect to the alignment cube can be measured with a digital angle gauge, for example. The shift and rotation between the reference and test images corresponds to the difference between the test camera line of sight vector 143 and the alignment cube reference vector 133. This difference can be used to determine optical frame orientation (roll angle, pitch angle, and yaw angle) of the test camera 140 with respect to the alignment cube 130. For example, the roll angle of the test camera may be the sum of the measured reference camera orientation and the relative rotation of the near-center centroids between the reference and test images.

During image acquisition, light reflected from the first surface 11 of the calibration pattern object 10 (e.g., calibration pattern board) is reflected from the parabolic mirror 150 to the test camera 140. The test camera 140 is configured to capture at least one test image of the calibration pattern object 10 based on light reflected by the parabolic mirror 150. The camera calibration system 100 is shown during an instant of time during operation in which the calibration pattern object 10 being imaged is present. The alignment hole 12 in calibration pattern object 10 may be plugged with an opaque material during image acquisition. The test camera 140 has a test camera reference frame or boresight reference frame (BRF) defined by an $x_{BRF}$ axis, an $y_{BRF}$ axis, and a $z_{BRF}$ axis. The origin of these axes defines the optical center location. The $x_{BRF}$ axis (not shown) is perpendicular to a plane along the $y_{BRF}$ axis and the $z_{BRF}$ axis. The center of the test camera reference plane is at a first distance, $D_2$, from the center of the mirror hole 151 of the parabolic mirror 150. The optical frame orientation includes a roll angle, $\phi$, a pitch angle, $\Theta$, and a yaw angle, $\psi$.

According to various implementations, test cameras that can be calibrated by techniques described herein can capture test images based on light across various wavelength spectrums such as visible light spectrum, infrared spectrum, ultraviolet spectrum, etc. According to certain aspects, test cameras being calibrated can capture test images based on a visible (VIS) spectrum (e.g., wavelength range between 0.38-0.75 μm), a near infrared (NIR) spectrum (e.g., wavelength range between 0.75-1.4 μm), a middle wavelength infrared (MWIR) spectrum (e.g., wavelength range between 3.0-5.0 μm), a long wavelength infrared (LWIR) spectrum (e.g., wavelength range between 8.0-14.0 μm), long-wave ultraviolet (UVA) spectrum (e.g., wavelength range between 315-400 nm), medium-wave ultraviolet (UVB) spectrum (e.g., wavelength range between 280-314 nm), short-wave ultraviolet (UVC) 10 and 400 nm), and other light spectrums. In one aspect, the test camera is an infrared camera that can capture one or more infrared test images. In one aspect, the test camera is a visible light camera that can capture one or more visible light test images. In one aspect, the test camera is a visible light camera that can capture one or more ultraviolet test images. In one aspect, the test camera is a LWIR infrared camera that can capture one or more test images based on wavelengths in range between 8.0-14.0 μm. In one aspect, the test camera is an ultraviolet camera that can capture one or more test images based on wavelength of about 200 nm.

In FIG. 1, the alignment cube 130 (e.g., cube with mirrors on more than one side, cube with mirrors on all six sides, etc.) is attached to the test camera 140 via, for example, an adaptor plate, a bracket, or other suitable attachment. The alignment cube 130 can provide a frame of reference when aligning other system components and when characterizing the calibration parameters of the test camera and/or the reference camera. The alignment cube 130 includes an alignment cube reference frame (ARF) defined by an $x_{ARF}$ axis, an $y_{ARF}$ axis, and a ZARF axis. The $x_{ARF}$ axis (not shown) is perpendicular to a plane at the $y_{ARF}$ axis and the ZARF axis. In various implementations, the reference camera used to acquire the reference image (e.g., reference camera 240 in FIG. 2) is oriented to have its line of sight (LOS) be parallel to a reference vector perpendicular to reflective surface of the alignment cube with the relative roll measured by a digital angle gauge, for instance. For example, the reference camera 270 shown in FIG. 2 has a reference camera line of sight (LOS) vector 243 that is parallel to a reference vector 133 perpendicular to reflective surface 131 of alignment cube 130 in FIG. 1.

Referring back to FIG. 1, the calibration pattern object 10 includes an alignment hole 12 at or near its center. The alignment hole 12 is plugged during imaging with, for example, a plug of opaque material. The imaged spot at the alignment hole 12 can provide a well-known center centroid correspondence. The camera calibration system 100 also includes a mirror 160 coupled to a backside surface of the calibration pattern object 10. In other implementations, the alignment hole 12 and/or the mirror 160 may be omitted. In one example, the alignment hole 12 may have a diameter of 3 mm. According to one implementation, to align the calibration pattern object 10 to be perpendicular to the light beam from the laser source 110, the calibration pattern object 10 may be translated and rotated until the light beam passes through the mirror hole 151 in the parabolic mirror 150 is reflected from the mirror 160. In some cases, the calibration pattern object 10 may be attached to the mirror 160 after all the other system components have been aligned.

The first surface 11 of the calibration pattern object 10 is at a first distance, $D_1$, from the mirror hole 151 of the parabolic mirror 150. During a calibration process, the calibration pattern object 10 can be translated (denoted by double arrow) to any distance, $D_1$, from parabolic mirror 150 to simulate any virtual object distance in space. For example, the calibration pattern object 10 (e.g., object with grid pattern) can be set to a virtual distance that approaches infinity by moving the calibration pattern object 10 to an appropriate corresponding distance, $D_1$, from the parabolic mirror 150. In one instance, a grid pattern can be set for a virtual distance of 100 m as may be used in RPO missions by moving the grid pattern to corresponding distance, $D_1$, of 229.1 mm from a 228.6 mm focal length parabolic mirror. In some implementations, the camera calibration system 100 may further include a mechanism (e.g., an X-Y stage) for translating the calibration pattern object 10 to different first distances, $D_1$, to accommodate different fine virtual target distances up to infinity to match the focus distance of the test camera 140.

In various embodiments, camera calibration systems include a laser source (e.g., laser source 110 in FIG. 1, laser source 210 in FIG. 2, and laser source 310 in FIG. 3) for emitting a light beam that can be used to orient or align system components. The laser source may be a continuous wave laser. Some examples of laser sources that can be used include laser diode, HeNe laser, and ND:YAG laser.

In various embodiments, camera calibration systems include one or more optical systems with optical elements for propagating between system components and/or modifying light paths. For example, camera calibration systems may include one or more beam splitters, one or more mirrors, one or more optical apertures, at least one retroreflector, etc. In some cases, optical elements may be configured to align lines of sight (LOS) of systems components with optical paths or lines of sight of other system components. For example, in one implementation of the camera calibration system 100 shown in FIG. 1, the optical system 120 may further include a pair of mirrors in the optical path between the alignment cube 130 and the beam splitter 122. The pair of mirrors may be positioned/oriented to reflect light from the alignment cube 130 to the beam splitter 122 at 90 degrees (perpendicular) to the optical path of the light beam from the laser source 110. In this example, the pair of mirrors may be adjusted until the exit beams 126, 127 converge to the same optical path indicating light reflected by the alignment cube 130 is propagated along an optical path that is perpendicular to the optical path of the light beam from the laser source 110. In an alternative embodiment, the alignment cube 130 can be adjusted until the exit beams 126, 127 converge. In one embodiment, the reference camera assembly has a mirror, that can be pre-calibrated to the LOS of the reference camera. When the test camera assembly is located in in the same place (with mirror pair and laser unperturbed) as the reference camera assembly and oriented to have the same laser beam convergence, the reference camera LOS vector 143 is perfectly parallel to the normal reference vector 133 of the alignment cube surface.

As used herein, a parabolic mirror generally refers to a mirror with a reflective surface having curvature in the shape of a parabola along two or three dimensions. Parabolic mirrors focus incident light to a single focal point. Some examples of parabolic mirrors include off-axis parabolic mirrors, full parabolic mirrors, etc. In various embodiments, camera calibration systems include a parabolic mirror to enable the calibration pattern object to be placed close to the parabolic mirror during calibration of the test camera for focal distances of 100 m or more. In various implementations, the parabolic mirrors may have a radius of curvature of 12 inches, 18 inches, 24 inches, 30 inches, or 50 inches. In various implementations, the parabolic mirrors may have a focal length of 6 inches, 9 inches, 12 inches, 15 inches, or 25 inches.

In FIG. 1, the camera calibration system 100 includes a parabolic mirror 150 (e.g., off-axis parabolic (OAP) mirror) that enables the calibration pattern object 10 to be placed close to (e.g., within 229.1 mm and 228.6 mm of) the parabolic mirror (228.6 mm FL) 150 during calibration of the test camera for focal distances of 100 m to infinity. The parabolic mirror 150 can focus/collimate and reflect light. In FIG. 1, the parabolic mirror 150 is configured to reflect images of the calibration pattern object 10 onto the sensor plane of the test camera 140. Some examples of parabolic mirrors that may be used in certain implementations are off-axis parabolic (OAP) mirrors manufactured by Edmund Optics or Thorlabs. In the illustrated example, the parabolic mirror 150 includes a mirror hole 151 at or near the center of the parabolic mirror 150. Images of the calibration pattern object 10 captured by the test camera 140 and the reference camera (e.g., reference camera 240 in FIG. 2) include a dark spot that corresponds to the location of the mirror hole 151. A comparison of the location of the dark spot in the test image with the dark spot in the reference image may be used to automate the centroid pairing of the reference and test images.

According to various embodiments, parabolic mirrors may include one or more reflective coatings (e.g., silver coating, gold coating, aluminum coating, etc.) on a reflective surface to reflect light across one or more corresponding wavelength spectrums. For example, the parabolic mirror 150 in FIG. 1 includes a reflective surface 152 upon which one or more reflective coatings are disposed. In certain implementations, the parabolic mirror 150 has one or more reflective coatings for reflecting visible (VIS) wavelengths (e.g., wavelengths between 0.38-0.75 μm), near infrared (NIR) wavelengths (e.g., wavelengths between 0.75-1.4 μm), middle wavelength infrared (MWIR) (e.g., wavelengths between 3.0-5.0 μm), and/or long wavelength infrared (LWIR) (e.g., wavelengths between 8.0-14.0 μm). In one aspect, the parabolic mirror 150 includes a gold reflective coating for reflecting broadband light with wavelengths in range of 0.80-20 μm. In one aspect, the parabolic mirror 150 includes a UV-enhanced aluminum reflective coating for reflecting wavelengths in range of 0.25-0.45 μm. In one aspect, the parabolic mirror 150 includes an aluminum reflective coating for reflecting wavelengths in range of 0.45-20 μm. One can, for example, choose the rugged aluminum coating and use the system to calibrate all VIS, NIR, MWIR, and LWIR cameras.

In some implementations, the camera calibration system 100 may also include a kinematic mount upon which the parabolic mirror 150 is mounted. The kinematic mount is configured to allow for pitch and yaw adjustments to the orientation of the parabolic mirror 150. In these implementations, the camera calibration system 100 may also include an adaptor coupled to the parabolic mirror 150 for coupling to the kinematic mount. Fine adjustments to the pitch and yaw can be used to reduce the aberration by the parabolic mirror as observed by the cameras.

The camera calibration system 100 also includes a power supply 180 coupled to the test camera 140 via, for example, a power cable. The power supply 180 may be any suitable power source for providing power to the test camera 140 and/or other system components. In addition, the camera calibration system 100 includes a computing device 190 in electronic communication with the test camera 140 via, for example, a data cable. The computing device 190 includes one or more processors 192 (e.g., microprocessors), a non-transitory computer readable medium (CRM) 194 in communication with the processor(s) 192, and an optional (denoted by dashed line) display 196 also in communication with processor(s) 192. The processor(s) 192 is in electronic communication with the test camera 140 to receive signal(s) with image data for the raw test images acquired and/or to send control signals to capture the test images. In one case, the processor(s) 192 are also in electronic communication with the laser source 110 to control light being emitted.

Processor(s) 192 is in electronic communication with CRM 194 (e.g., memory) to communicate image data and other data to CRM 194. Processor(s) 192 is also in electronic communication with the optional display 196 to send display image data and instructions to control displaying images and other output data to, e.g., a user of the camera calibration system 100. The electronic communication between components of system 100 may be in wired form, in wireless form, or a combination of wired and wireless. Processor(s) 192 may retrieve and execute instructions stored on the CRM 194 to perform one or more operations of camera calibration methods such as the camera calibration methods depicted in FIGS. 5, 6, and 14.

The CRM 194 can store instructions for performing one or more functions of the camera calibration system 100. These instructions may be executable by processor(s) 170 or other processing components of the camera calibration system 100. CRM 194 can also store raw images acquired during the acquisition process, intrinsic calibration parameters, extrinsic calibration parameters, and other data associated with functions of the camera calibration system 100.

Certain modifications, additions, or omissions may be made to the camera calibration system 100 without departing from the scope of the disclosure. In addition, the components of the camera calibration system 100 or the components of other camera calibration systems may be integrated or separated according to particular needs. For example, in one embodiment, the laser source 110 may oriented to direct the light beam; for example, in another implementation of the camera calibration system 100, the laser source 110 may be oriented to direct the light beam in a direction opposite the reference vector 133 and located on the opposite side of the beam splitter 122. As another example, in another implementation of the camera calibration system 100 that accommodates a wide field-of-view test camera, the calibration pattern object 10 may be tilted from the parabolic mirror 150 to achieve smaller distortion.

FIG. 2 is a schematic illustration depicting one example of components of a camera calibration system 200 including a (second) reference camera 240, in accordance with embodiments. The camera calibration system 200 includes some elements that are the same, similar or analogous to elements shown in FIG. 1. For the sake of brevity, the prior discussion of such elements with regard to FIG. 1 may be assumed to be equally applicable, unless indicated otherwise in the following discussion, to those elements in FIG. 1 that share the same last two digits in their respective callouts as in FIG. 2.

The camera calibration system 200 also includes a laser source 210 configured to emit a light beam, an optical system 220 with a beam splitter 222, a second mirror 230, and a parabolic mirror 250 configured to reflect light to the reference camera 240. The reference camera 240 is configured to capture at least one reference image of the calibration pattern object 20 based on light reflected by the parabolic mirror 250. The beam splitter 222 is configured to split the light beam from the laser source 210 into a first beam reflected to the second mirror 230 and a second beam transmitted through a mirror hole 251 in the parabolic mirror 250 to the calibration pattern object 20. The second mirror 230 has a reference vector 233 in a direction perpendicular (normal) to a reflective surface 231. Light reflected by the second mirror 230 may be transmitted through the beam splitter 222 as a first exit beam 226. The calibration pattern object 20 includes an alignment hole 22 at or near the center and a first mirror 260 attached to a second (back-side) surface opposing a first (front-side) surface 21. When the alignment hole 22 of the calibration pattern object 20 is not plugged by an opaque material (e.g., during alignment of the calibration pattern object 20), light from the second beam is reflected by the first mirror 260 and transmitted through the mirror hole 251 to the beam splitter 222 and reflected as a second exit beam 227. The camera calibration system 200 also includes an $x_{RFF}$ axis, a $y_{REF}$ axis, and a $z_{REF}$ axis (reference axes). The second mirror 230 and first surface 21 of calibration pattern object 20 are perpendicular to a reference plane formed by the $x_{RFF}$ axis and the $y_{REF}$ axis. The laser source 210 is positioned and oriented to direct the light beam along the $y_{REF}$ axis. The illustrated example shows the first exit beam 126 and second exit beam 127 coincide indicating that the reference vector 133 of second mirror 230 and first surface 11 of calibration pattern object 10 are perpendicular to an optical path of the light beam from the laser source 110 and perpendicular to the reference plane. During an alignment procedure, the second mirror 230 and calibration pattern object 20 may be positioned/oriented until the first exit beam 226 and second exit beam 227 converge to coincide.

In various implementations, components of the camera calibration system 200 in FIG. 2 and/or components of the calibration system 100 in FIG. 1 are positioned/oriented such that the line of sight vector 243 of reference camera 240 is parallel to the reference vector 233 of second mirror 230 in FIG. 2 and the reference vector 233 coincides with the reference vector 133 of alignment cube 130 in FIG. 1. For example, the second mirror 230 and/or reference camera 240 in FIG. 2 may be positioned/oriented to orient the mirror vector 233 to be parallel with the reference camera line of sight vector 243 of the reference camera 240.

During image acquisition, light reflected from the first surface 21 of the calibration pattern object 20 is reflected from the parabolic mirror 250 to the reference camera 240. The reference camera 240 is configured to capture at least one reference image of the calibration pattern object 20 based on light reflected by the parabolic mirror 250. The camera calibration system 200 is shown during an instant of time during operation in which the calibration pattern object 20 being imaged is present. The alignment hole 22 in calibration pattern object 20 may be plugged with an opaque material during image acquisition. The reference camera 240 has a reference camera reference frame (MRF) defined by an $x_{MRF}$ axis, an $y_{MRF}$ axis, and a $z_{MRF}$ axis. The $x_{MRF}$ axis (not shown) is perpendicular to the $y_{MRF}$ axis and the $z_{MRF}$ axis. The origin of these axes defines the optical center location. The origin of the reference camera reference plane (MRF) is at a first distance, $D_2$, from the center of the mirror hole 251 of the parabolic mirror 250. The reference camera 240 is configured to capture one or more reference images based on light of wavelengths including the wavelength spectrum captured by the test camera 140 in FIG. 1. The optical frame orientation includes a roll angle, ϕ, a pitch angle, Θ, and a yaw angle, ψ.

The first surface 21 of the calibration pattern object 20 is at a first distance, $D_1$, from the mirror hole 251 of the parabolic mirror 250. During a calibration process, the calibration pattern object 20 can be translated (denoted by double arrow) to any distance, $D_1$, from parabolic mirror 250 to simulate any virtual object distance of the reference camera 240 in space. In some implementations, the camera calibration system 200 may further include a mechanism (e.g., an X-Y stage) for translating the calibration pattern object 20 to different first distances, $D_1$, to accommodate different focal distances up to infinity.

The camera calibration system 200 includes a parabolic mirror 250 that can focus/collimate and reflect light. The parabolic mirror 250 is configured to reflect images of the calibration pattern object 20 onto the sensor plane of the reference camera 240. The parabolic mirror 250 includes a mirror hole 251 at or near the center of the parabolic mirror 250. The parabolic mirror 250 may include one or more reflective coatings (e.g., silver coating, gold coating, aluminum coating, etc.) on a reflective surface 252 to reflect light across one or more corresponding wavelength spectrums. For example, the parabolic mirror 250 may include one or more reflective coatings for reflecting visible (VIS) wavelengths (e.g., wavelengths between 0.38-0.75 μm), near infrared (NIR) wavelengths (e.g., wavelengths between 0.75-1.4 μm), middle wavelength infrared (MWIR) (e.g., wavelengths between 3.0-5.0 μm), and/or long wavelength infrared (LWIR) (e.g., wavelengths between 8.0-14.0 μm). In one implementation, the camera calibration system 200 also includes a kinematic mount upon which the parabolic mirror 250 is mounted. The kinematic mount is configured to allow for pitch and yaw adjustments to the orientation of the parabolic mirror 250. In these implementations, the camera calibration system 200 may also include an adaptor coupled to the parabolic mirror 250 for coupling to the kinematic mount.

The camera calibration system 200 also includes a power supply 280 coupled to the reference camera 240 via, for example, a power cable. The power supply 280 may be any suitable power source for providing power to the reference camera 240 and/or other system components. In addition, the camera calibration system 200 includes a computing device 290 in electronic communication with the reference camera 240 via, for example, a data cable. The computing device 290 includes one or more processors 292 (e.g., microprocessors), a non-transitory computer readable medium (CRM) 294 in communication with the processor(s) 292, and an optional (denoted by dashed line) display 296 also in communication with processor(s) 292. The processor (s) 292 is in electronic communication with the reference camera 240 to receive signal(s) with image data for the raw reference images acquired and/or to send control signals to capture the reference images. In one case, the processor(s) 292 are also in electronic communication with the laser source 210 to control light being emitted.

Certain modifications, additions, or omissions may be made to the camera calibration system 200 without departing from the scope of the disclosure. In addition, the components of the camera calibration system 200 or the components of other camera calibration systems may be integrated or separated according to particular needs.

Figure 3:
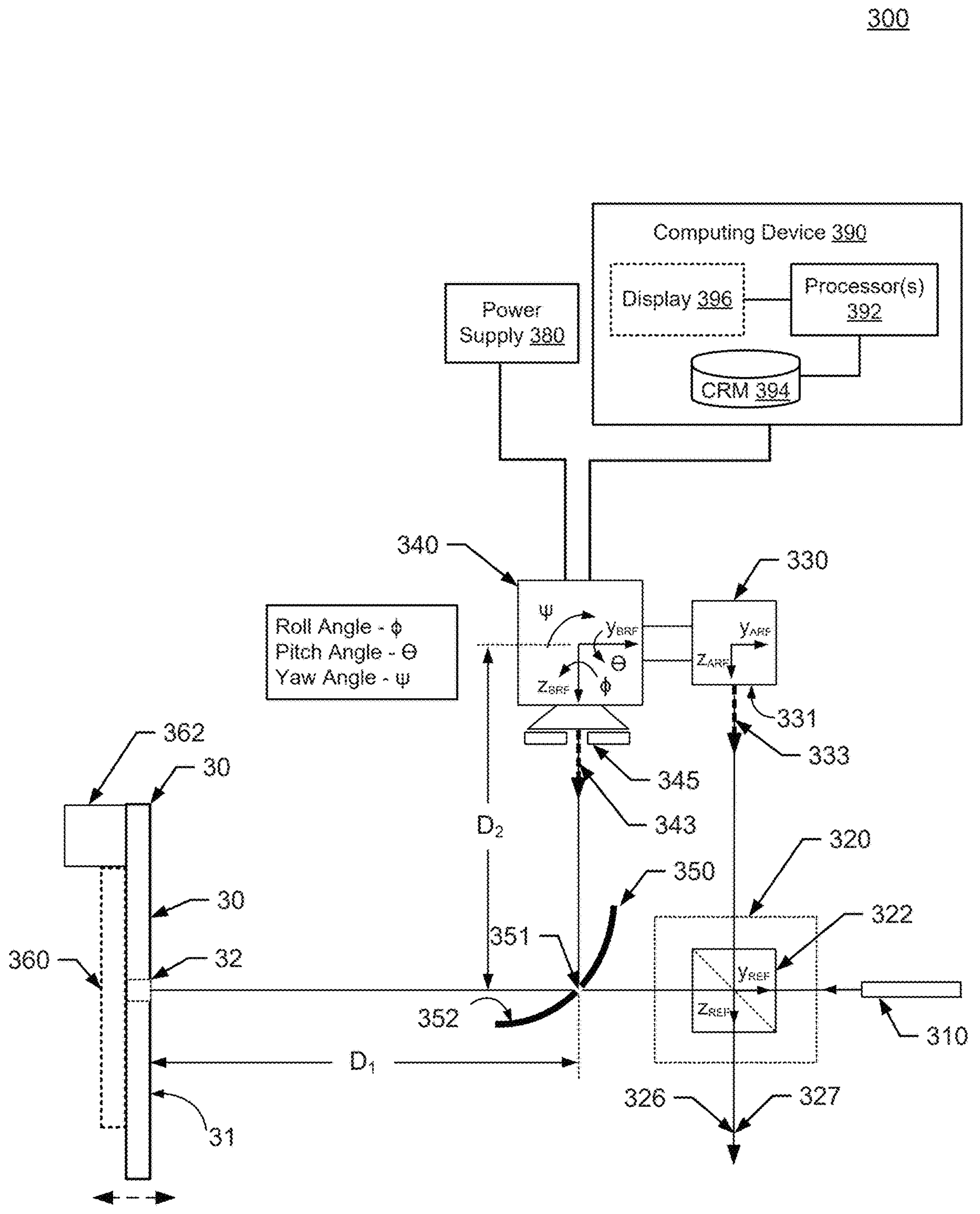
FIG. 3 is a schematic illustration depicting one example of components of a camera calibration system that can be used to calibrate infrared cameras, in accordance with some embodiments.

FIG. 3 is a schematic illustration depicting one example of components of a camera calibration system 300 that can be used to calibrate infrared cameras, in accordance with some embodiments. Some of the elements shown in FIG. 3 are similar or analogous to elements shown in FIG. 1. For the sake of brevity, the prior discussion of such similar or analogous elements with regard to FIG. 1 may be assumed to be equally applicable, unless indicated otherwise in the following discussion, to the similar or analogous counterparts of those elements in FIG. 3 that share the same last two digits in their respective callouts as in FIG. 1.

The camera calibration system 300 includes a laser source 310 configured to emit a light beam, an optical system 320 with a beam splitter 322, an alignment cube 330, a test camera 340 attached to the alignment cube 330, a parabolic mirror 350 configured to reflect light to the test camera 340, a power supply 380, and a computing device 390. The computing device 390 includes an optional display 396, one or more processors 392, and a computer readable medium (CRM) 394.

The test camera 340 has a test camera reference frame or boresight reference frame (BRF) defined by an $x_{BRF}$ axis, an $y_{BRF}$ axis, and a $z_{BRF}$ axis. The origin of these axes defines the optical center location. The $x_{BRF}$ axis (not shown) is perpendicular to the $y_{BRF}$ axis and the $z_{BRF}$ axis. The center of the test camera reference plane is at a first distance, $D_2$, from the center of the mirror hole 351 of the parabolic mirror 350. The optical frame orientation includes a roll angle, ϕ, a pitch angle, Θ, and a yaw angle, ψ.

The camera calibration system 300 also includes a heater 362 to provide thermal contrast to calibration pattern object 30 during image acquisition. In other examples, the heater 362 may be thermally coupled to another portion of the calibration pattern object 30. Some examples of suitable heaters that can be used include patch heaters, blowers, and IR black-bodies. The heater 362 may be in electronic communication with the computing device 390 to receive control instructions.

The test camera 340 is an infrared camera that can capture infrared images based on light across one or more infrared wavelength spectrums. The test camera 340 is configured to capture at least one test image of the calibration pattern object 30 based on infrared radiation emitted from the calibration pattern object 30 and reflected by the parabolic mirror 350 to the test camera 340. In certain implementations, the test camera 340 may be able to capture at least one test image based on a near infrared (NIR) spectrum (e.g., wavelength range between 0.75-1.4 μm), a middle wavelength infrared (MWIR) spectrum (e.g., wavelength range between 3.0-5.0 μm), and/or a long wavelength infrared (LWIR) spectrum (e.g., wavelength range between 8.0-14.0 μm). The camera calibration system 300 also includes an optical aperture 345 (e.g., an iris diaphragm, plate with a pinhole or slit, etc.) in front of the collection optics of the test camera 340 to control the amount of infrared radiation reaching the camera sensor. In some implementations, the aperture 345 may be an adjustable aperture (e.g., adjustable diaphragm), or a fixed radius aperture.

Certain modifications, additions, or omissions may be made to the camera calibration system 300 without departing from the scope of the disclosure. In addition, the components of the camera calibration system 300 or the components of other camera calibration systems may be integrated or separated according to particular needs.

Figure 4A:
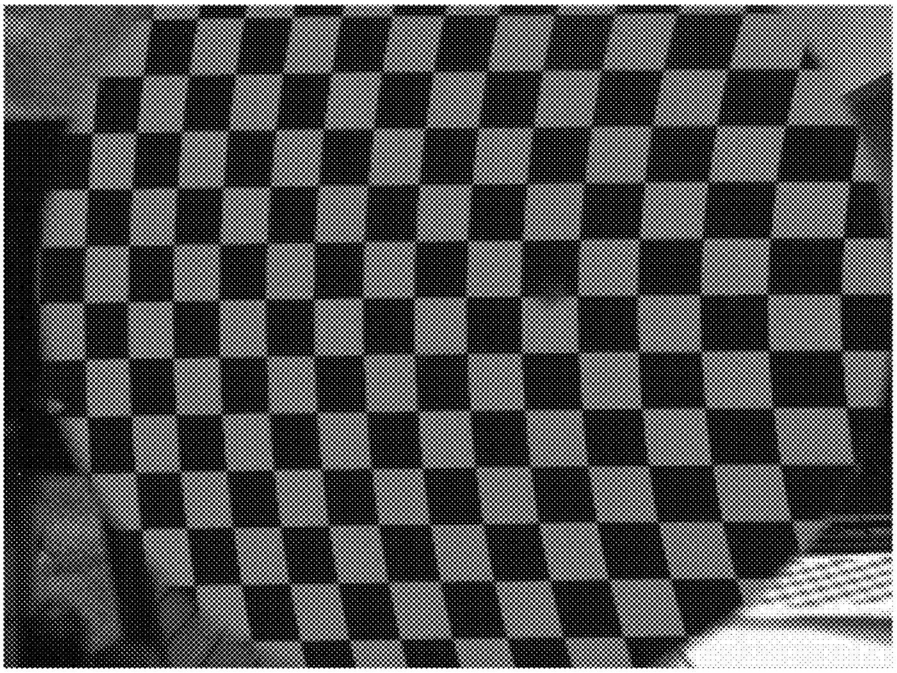
FIG. 4A is an example of an image of a reflection of a first checkerboard pattern board with 6 mm grid pattern squares on a parabolic mirror, according to an embodiment.
Figure 4B:
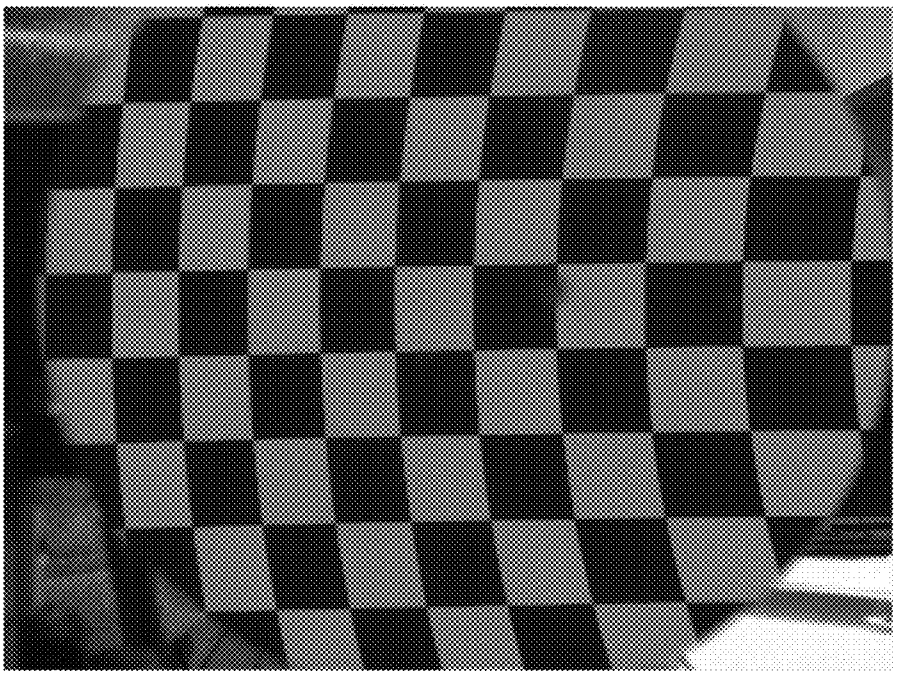
FIG. 4B is an example of an image of a reflection of a second checkerboard pattern board with 6 mm grid pattern squares on a parabolic mirror, according to an embodiment.

In various implementations, calibration pattern objects (e.g., calibration pattern object 10 in FIG. 1, calibration pattern object 20 in FIG. 2, and calibration pattern object 30 in FIG. 3) may include various calibration patterns. Some examples of suitable calibration patterns include a dot pattern, a checkerboard pattern, a grid pattern, etc. Curvature of parabolic mirrors can create distortion of reflected images captured by cameras. FIG. 4A is an example of an image of a reflection of a first checkerboard pattern board with 6 mm grid pattern squares on a parabolic mirror, according to an embodiment. FIG. 4B is an example of an image of a reflection of a second checkerboard pattern board with 6 mm grid pattern squares on a parabolic mirror, according to an embodiment. The images in FIGS. 4A and 4B were captured by a visible light camera. As shown, the parabolic mirror distorts the images of the checkerboard patterns. With the implementation of parabolic mirrors, certain camera calibrations systems disclosed herein include techniques that can calibrate a test camera to account for distortion from the parabolic mirror by comparing measurements taken by the test camera with those of the reference camera.

II. Examples of Camera Calibration Methods

In various embodiments, camera calibration techniques disclosed herein can simultaneously determine intrinsic and extrinsic calibration parameters for a test camera based on a test image captured by the test camera and a reference image captured by a reference camera. In some cases, extrinsic calibration parameters may require an additional crosshair center location. The intrinsic and extrinsic calibration parameters can be used to calibrate the test camera.

The intrinsic calibration parameters of a camera pertain to the camera's internal calibration of the camera collection lens and/or the camera sensor/detector. The intrinsic calibration parameters may describe a mapping at the image plane (e.g., a 3D scene in front of the camera) to the pixels in the image captured by the camera. Some examples of intrinsic calibration parameters include: a camera constant (c), a focal length (m) of the collection optics lens, a pixel size, a principal point of the image in x and y coordinates ($x_H$, $y_H$), a sheer compensation(s), and one or more distortion (aberration) coefficients. Some examples of distortion coefficients include a first radial distortion coefficient ($k_1$), a second radial distortion coefficient ($k_2$), a third radial distortion coefficient ($k_3$), a first tangential distortion coefficient ($p_1$), and a second tangential distortion coefficient ($p_2$).

In various embodiments, camera calibration techniques determine one or more intrinsic calibration parameters of a test camera. In some cases, the camera calibration techniques determine one or more of a focal length of the collection lens, a first radial (aberration) distortion coefficient ($k_1$), a second radial (aberration) distortion coefficient ($k_2$), a third radial distortion coefficient ($k_3$), a first tangential distortion coefficient ($p_1$), a second tangential distortion coefficient ($p_2$), or a principal point location of the image in x and y coordinates ($x_H$, $y_H$).

The principal point of an image represents the geometric center of the image where the camera's optical axis or direct line of sight (line perpendicular to image plane passing through center of collection lens) intersects the image plane. The coordinates of the principal point ($x_H$, $y_H$) of the image may be used to map points (pixels) on the image plane to points on the camera sensor plane. For example, the principal point (0, 0) of the image plane may be mapped to (0,0) of the origin of the coordinate axes of the camera sensor plane (e.g., at a corner of the camera sensor). In this example, the mapping is a shift in x and y along the camera image plane from a point at/near the center to the corner of the camera sensor.

In various embodiments, camera calibration techniques determine one or more extrinsic calibration parameters of a test camera such as an infrared camera. The extrinsic calibration parameters of a camera pertain to the position and heading of the camera in relation to the outside environment. Some examples of extrinsic calibration parameters include a camera sensor position (x, y, z) and camera sensor orientation (yaw, pitch, roll). The camera sensor position refers to the location of the optical center of the camera defined in x, y, and z coordinates (x, y, z). The camera sensor orientation is the heading/pointing of the camera and includes a yaw angle, a pitch angle and a roll angle. The camera sensor orientation refers to the optical frame orientation of the camera and includes a yaw angle, a pitch angle, and a roll angle.

Figure 5:
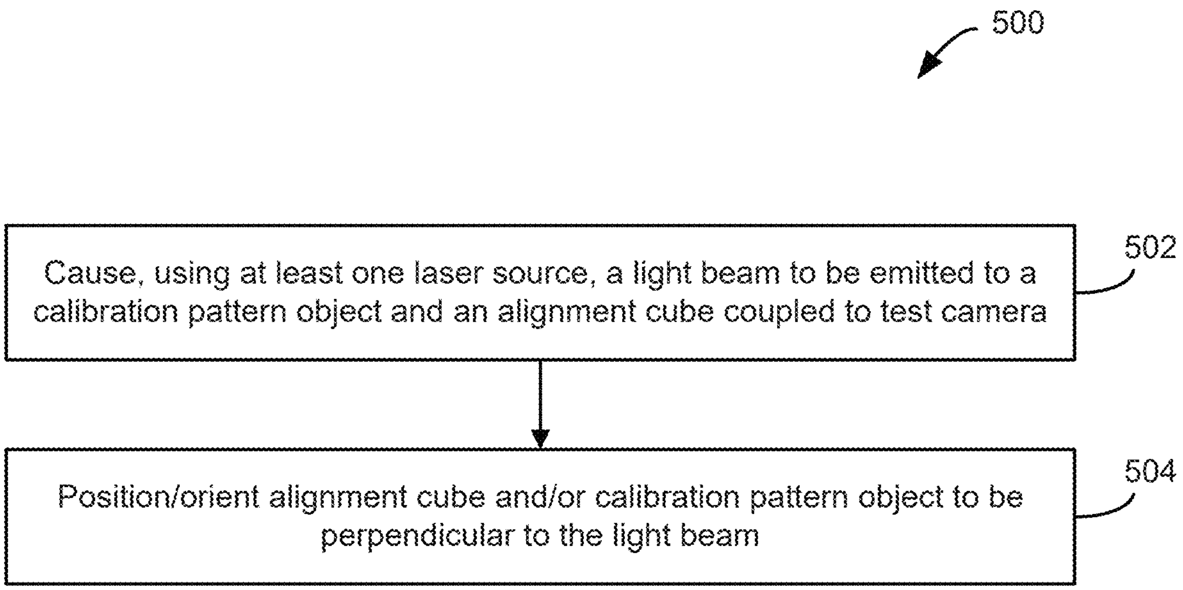
FIG. 5 is a flowchart depicting an example process for calibrating a test camera in accordance with some embodiments.

FIG. 5 is a flowchart depicting an example process 500 for calibrating a test camera in accordance with some embodiments. The process 500 involves one or more operations that position/orient an alignment cube such that its reference vector (reference vector 133 in FIG. 1 or reference vector 333 in FIG. 3) is perpendicular to a direction (optical path) of a light beam from a laser source and position/orient a calibration pattern object such that its frontside surface is perpendicular to the direction of a light beam. Certain blocks of the process 500 may be executed by one or more processors of one or more computing devices. Some examples of such computing devices include the computing device 190 shown in and described above in connection with FIG. 1 and the computing device described below in connection with FIG. 16. In some implementations, blocks of process 500 may be executed in an order other than what is shown in FIG. 5. In some embodiments, one or more blocks of process 500 may be omitted, and/or two or more blocks may be executed substantially in parallel.

Process 500 can begin at 502 by causing at least one laser source (e.g., laser source 110 in FIG. 1 or laser source 310 in FIG. 3) to emit a light beam. Using a beamsplitter, the light beam is split into a first beam and a second beam. The first beam may be transmitted through a mirror hole in a parabolic mirror to the frontside of a calibration pattern object such as a calibration board. The second beam may be reflected to an alignment cube coupled to the test camera. The calibration pattern object may have an alignment hole and a mirror coupled to the backside of the calibration pattern object. Light reflected by the alignment cube may be transmitted through the beam splitter as a first exit beam. Light from the second beam is reflected by the mirror coupled to the backside of the calibration pattern object and transmitted through the mirror hole in the parabolic mirror to the beam splitter and reflected as a second exit beam.

At 504, the alignment cube and calibration pattern object are positioned and/or oriented until the first and section exit beams converge. The first and section exit beams converge when the reference vector of the alignment cube and the frontside surface of the calibration pattern object are perpendicular to a direction (optical path) of the light beam from the laser source. In some implementations, the alignment cube and/or calibration pattern object may be positioned and/or oriented using a translation/rotational stage (e.g., an X-Y stage) or other suitable device. A computing device may be used to send control signals to the device to cause the device to adjust the position/orientation of the alignment cube and calibration pattern object until the first and exit beams converge.

Figure 6:
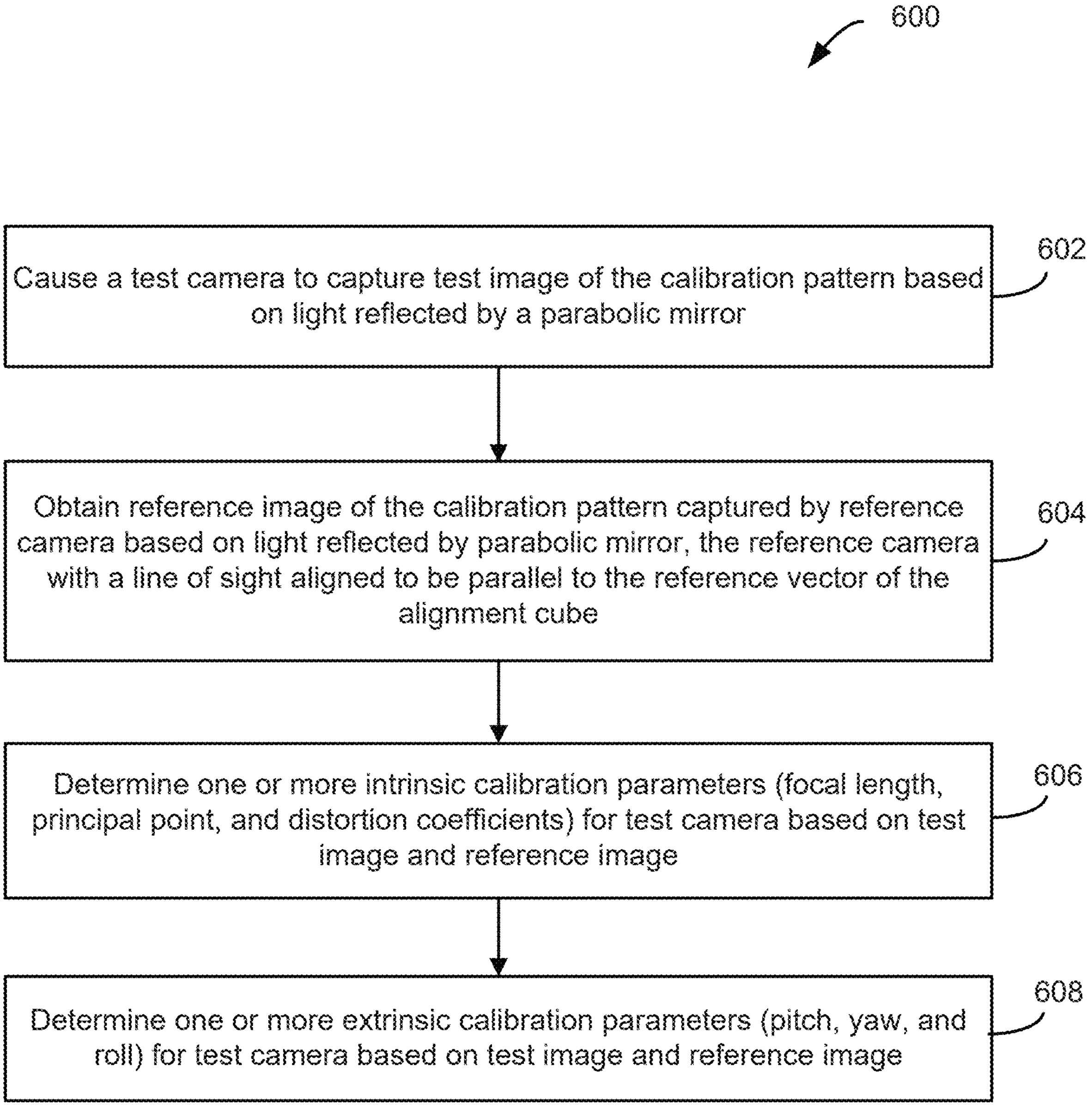
FIG. 6 is a flowchart depicting an example process for calibrating a test camera in accordance with some embodiments.

FIG. 6 is a flowchart depicting an example process 600 for calibrating a test camera in accordance with some embodiments. Certain blocks of the process 600 may be executed by one or more processors of one or more computing devices. Some examples of such computing devices include the computing device 190 shown in and described above in connection with FIG. 1 and the computing device described below in connection with FIG. 16. In some implementations, blocks of process 600 may be executed in an order other than what is shown in FIG. 6. In some embodiments, one or more blocks of process 600 may be omitted, and/or two or more blocks may be executed substantially in parallel. In one implementation, the process 600 also includes the operations described with reference to FIG. 5.

At 602, the process 600 causes a test camera to capture a test image of a calibration pattern object based on light reflected by a parabolic mirror. For example, control signals may be sent to the test camera 140 in FIG. 1 to cause the test camera 140 to capture a test image. As another example, control signals may be sent to the test infrared camera in FIG. 3 to cause the camera to capture a test infrared image. The test image is captured based on light reflected by a parabolic mirror to the test camera. For example, the test camera 140 in FIG. 1 can capture an image of the calibration pattern object 10 based on light reflected by the parabolic mirror 150 to the test camera 140. In certain implementations, the test camera is an infrared camera. In these cases, the process 600 may also include sending control signals to a heater (e.g., heater 362 in FIG. 3) to cause heat to be transferred to the calibration pattern object.

At 604, the process 600 obtains image data for a reference image of a calibration pattern object captured by a reference camera. For example, image data acquired during a reference image acquisition process may be retrieved from storage. As another example, the image data may be transmitted from another camera calibration system such as the camera calibration system 200 in FIG. 2. As another example, control operations may be sent to a calibration system such as the camera calibration system in FIG. 2 to cause the system to capture a reference image. The reference image may be captured based on light reflected by a parabolic mirror to the test camera. For example, the reference camera 240 in FIG. 2 can capture an image of the calibration pattern object 20 based on light reflected by the parabolic mirror 150 to the reference camera 240. The reference camera has a line of sight that is parallel to a reference vector of an alignment cube coupled to a test camera. For example, the reference camera 240 in FIG. 2 has a line of sight vector 243 that is parallel to the reference vector 233 of second mirror 230 which is parallel to the reference vector 133 of alignment cube 130.

At 606, one or more intrinsic calibration parameters of the test camera are determined based on the test image and the reference image. Some examples of intrinsic calibration parameters include: a camera constant (c), a focal length (m) of the collection optics lens, a pixel size, a principal point of the image in x and y coordinates ($x_H$, $y_H$), a sheer compensation(s), and one or more distortion (aberration) coefficients. Some examples of distortion coefficients include a first radial distortion coefficient ($k_1$), a second radial distortion coefficient ($k_2$), a third radial distortion coefficient ($k_3$), a first tangential distortion coefficient ($p_1$), and a second tangential distortion coefficient ($p_2$). In one example, the process determines the intrinsic parameters of focal length (m) of the collection optics lens, a first radial distortion coefficient ($k_1$), a second radial distortion coefficient ($k_2$), a third radial distortion coefficient ($k_3$), a first tangential distortion coefficient ($p_1$), and a second tangential distortion coefficient ($p_2$), and a principal point of the image in x and y coordinates ($x_H$, $y_H$). In one embodiment, the focal length can be determined from a ratio of the distances of the centroids to the center dark spot in the reference image to the distances of the centroids to the center dark spot in the test image.

Figure 7:
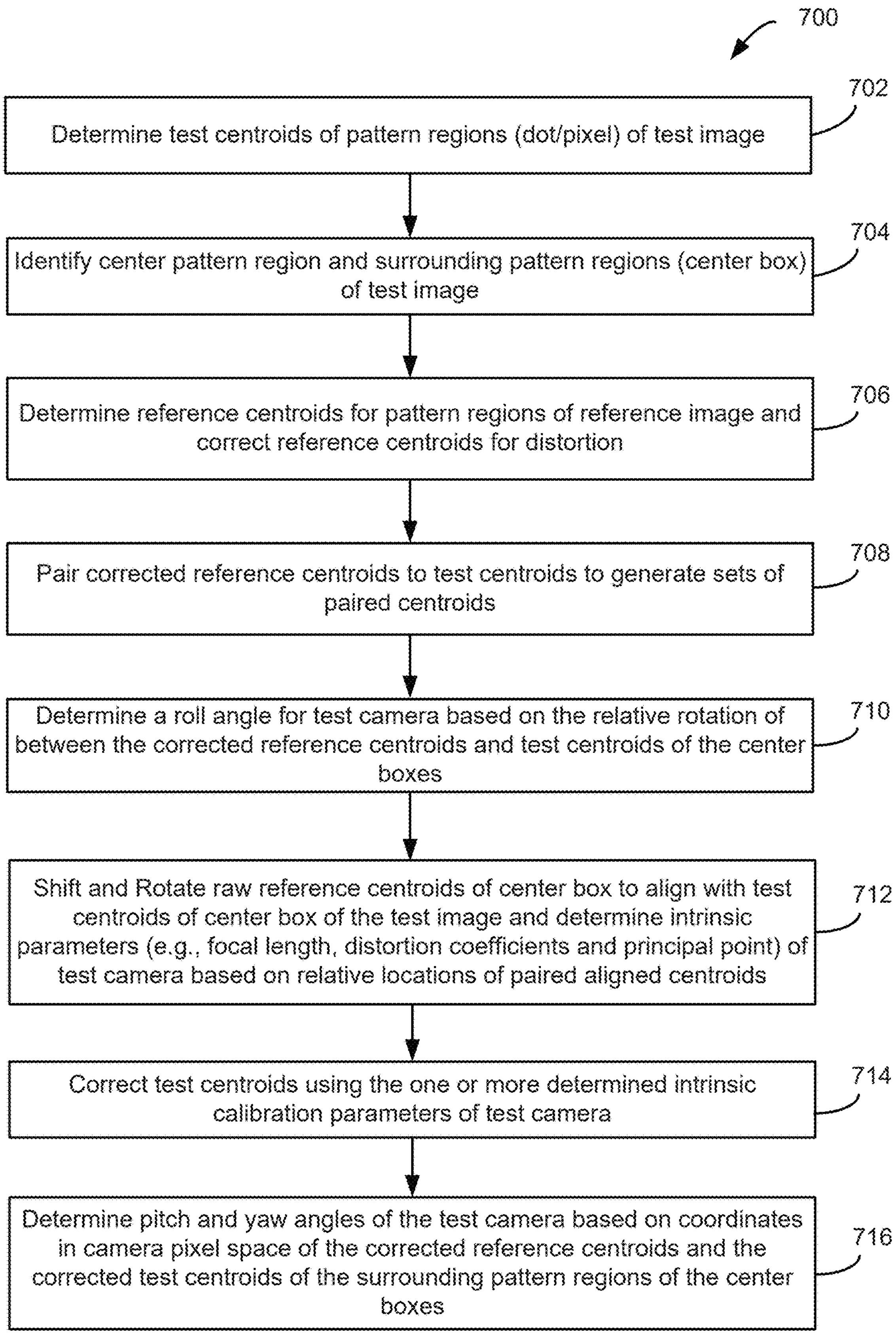
FIG. 7 is a flowchart depicting an example process for calibrating a test camera in accordance with some embodiments.

At 608, one or more extrinsic calibration parameters of the test camera are determined based on the test image and reference image. Some examples of extrinsic calibration parameters include a camera sensor position (x, y, z) and camera sensor orientation (yaw, pitch, roll). In one embodiment, the x, y, and z coordinates of the camera sensor position (X, Y, Z) and the yaw angle, a pitch angle, and a roll angle of the camera sensor orientation can be determined by comparing the locations of paired centroids of pattern regions in the test and reference images to determine the relative movement/rotation. FIG. 7 describes example operations that can be used to determine one or more intrinsic calibration parameters and one or more extrinsic calibration parameters from information derived from the test image and reference image, according to one embodiment.

FIG. 7 is a flowchart depicting an example process 700 for calibrating a test camera in accordance with some embodiments. Certain blocks of the process 700 may be executed by one or more processors of one or more computing devices. Some examples of such computing devices include the computing device 190 shown in and described above in connection with FIG. 1 and the computing device described below in connection with FIG. 16. In some implementations, blocks of process 700 may be executed in an order other than what is shown in FIG. 7. In some embodiments, one or more blocks of process 700 may be omitted, and/or two or more blocks may be executed substantially in parallel.

Figure 8:
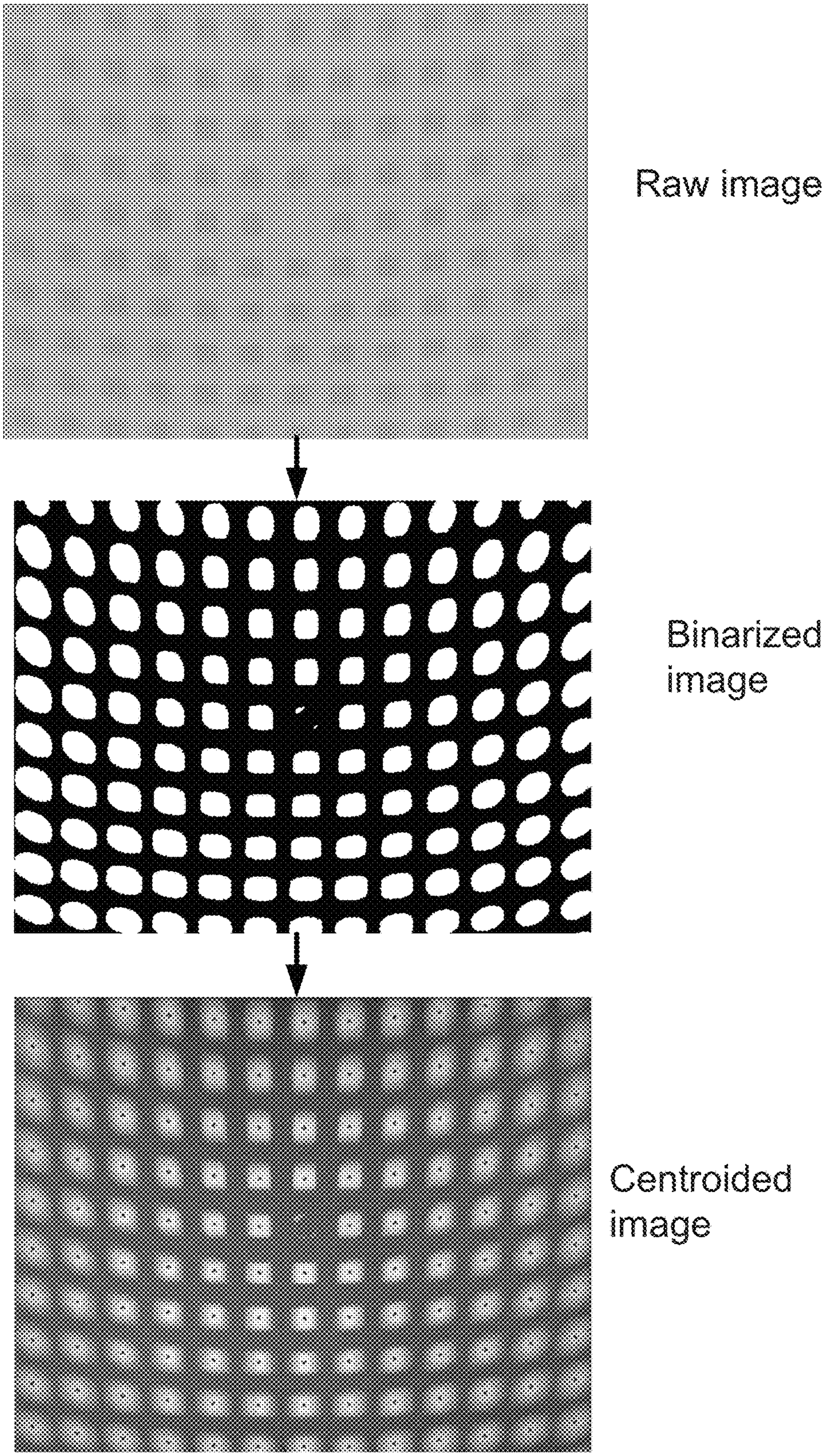
FIG. 8 is an illustration depicting an example of a process flow for determining centroids for pattern regions of a test image, according to an implementation.

At 702, the process 700 can begin by determining test centroids of pattern regions (dot/pixel) of a test image capture by the test camera. FIG. 8 is an illustration depicting an example of a process flow for determining centroids for pattern regions of a test image, according to an implementation. In this example, the raw image is binarized using a background noise threshold to extract the pattern regions (also referred to herein as dot patterns) from the raw test image. In some cases, the pattern regions may be assessed for circularity and area. Regions that are assessed to have a threshold area and circularity may be centroided by averaging their row/column coordinates. In some cases, such as with infrared images, the centroids are weighted by pixel intensity. In other cases, such as with visible images (i.e., images based on light detected in visible wavelength range), the same weight is applied to all centroids. In cases where a pattern region is clipped by the edge of the image plane, the centroid may be discarded unless a local maximum exists far enough (e.g., >5 pixels) from image boundary.

Figure 9:
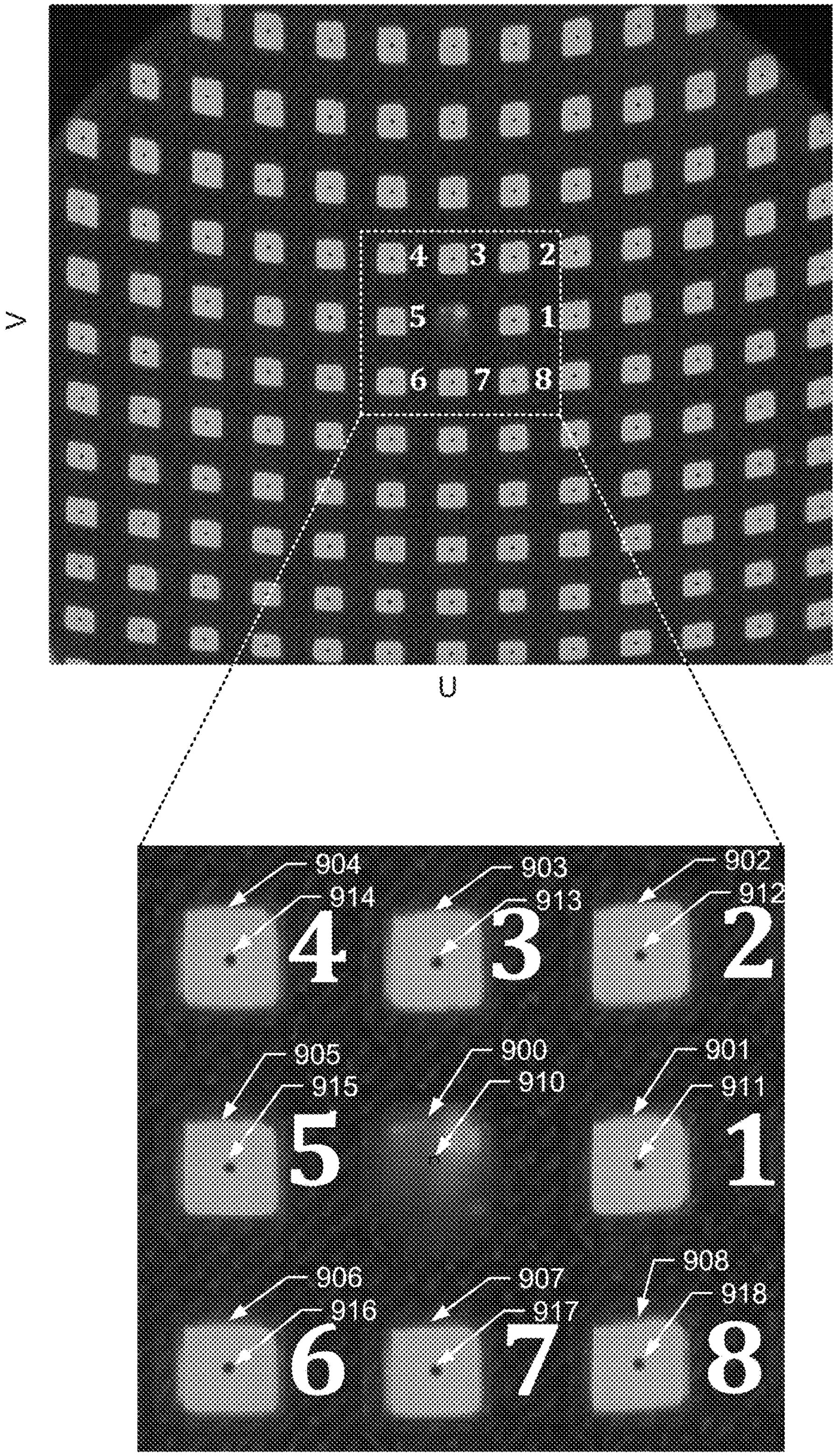
FIG. 9 is an illustration depicting an example of center box including a center pattern region that is plugged and surrounding eight pattern regions of a centroided image, according to an implementation.

At 704, the process 700 identifies a center pattern region and surrounding pattern regions (center box) of the test image and the corresponding test centroids. In certain cases, the center box includes a center pattern region and eight surrounding pattern regions. The center pattern region may correspond to a plugged center alignment hole in the calibration pattern board (e.g., alignment hole 12 in calibration pattern object 10 in FIG. 1) that is centered on the mirror through hole in the parabolic mirror (e.g., mirror hole 151 in FIG. 1). The center pattern region may appear as a dark spot on the centroided test image. The centroid of the center pattern region (sometimes referred to as center centroid) may be used as a reference to pair test centroids in the test image with reference centroids in the reference image. FIG. 9 is an illustration depicting an example of center box of a centroided test image including a center pattern region 900 that is plugged and surrounding eight pattern regions (identified as "1," "2," "3," "4," "5," "6," "7," and "8") 901, 902, 903, 904, 905, 906, 907, and 908 and corresponding centroids 910, 911, 912, 913, 914, 915, 916, 917, and 918, according to an implementation. The process 700 may identify the center pattern region and surrounding pattern regions based on the average spacing between each neighboring centroid (near the center of image). For example, the first pattern region 901 may be determined using the center plugged pattern region (hole) 900 as reference. For instance, the first pattern region 901 may be the nearest centroid to the center plugged pattern region (hole) 900 in the positive U direction (+U) in UV coordinates. In the illustrated example shown in FIG. 9, each successive pattern region and corresponding centroid of the center box is ordered counterclockwise around the plugged center pattern region.

Figure 10:
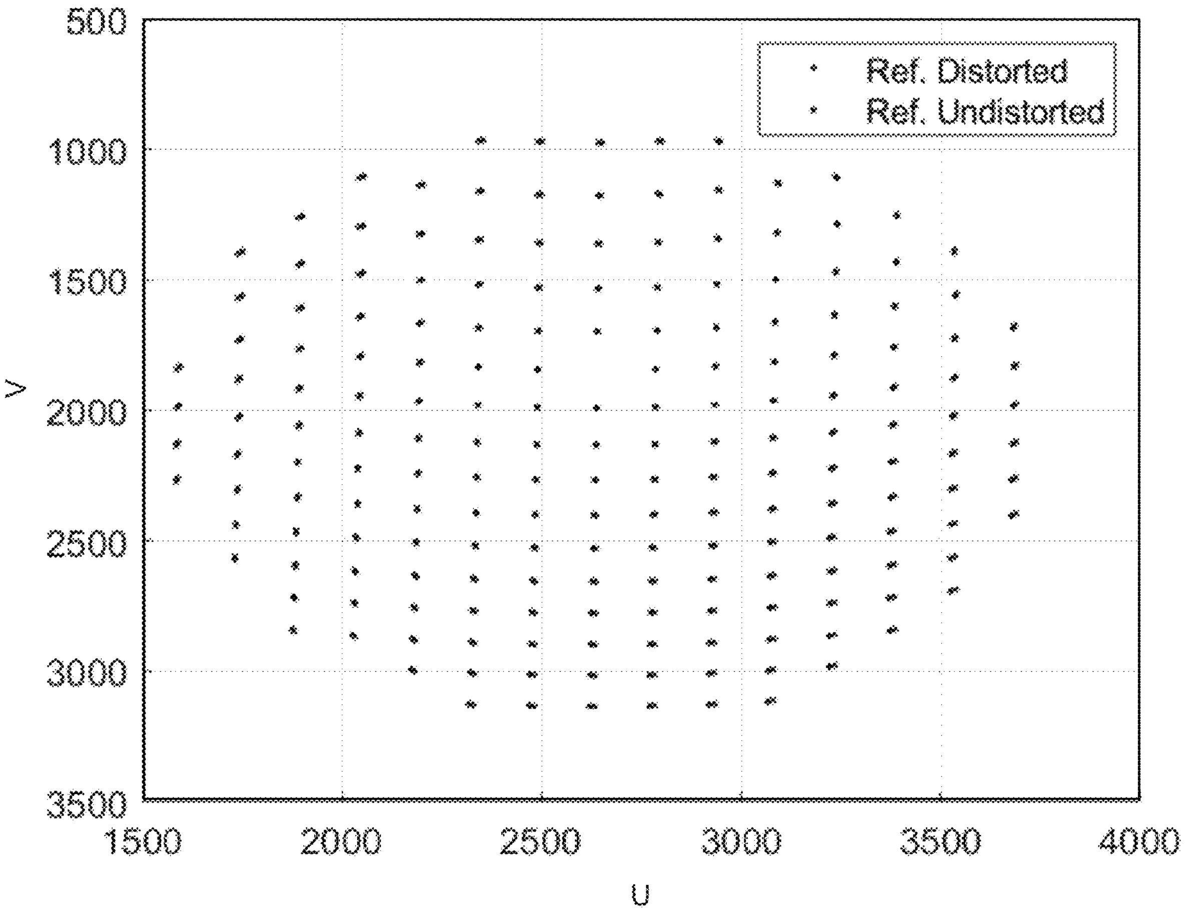
FIG. 10 is an illustration depicting an example of reference centroids before correction and reference centroids after correction, according to an implementation.

At 706, the process 700 determines centroids of a reference image (reference centroids) and corrects the reference centroids for distortion. Reference camera intrinsic parameters may be determined from star field images and traditional checkboard pattern images. Star field images are used to determine focal length which is used when calculating reference camera distortion coefficients from the checkboard images. In one implementation, the reference centroids may be determined using the process flow operations shown in and described with reference to FIG. 8. The reference centroids may be corrected for distortion using one or more distortion coefficients determined for the reference camera. FIG. 10 is an illustration depicting an example of reference centroids before correction and reference centroids after correction, according to an implementation.

Figure 11:
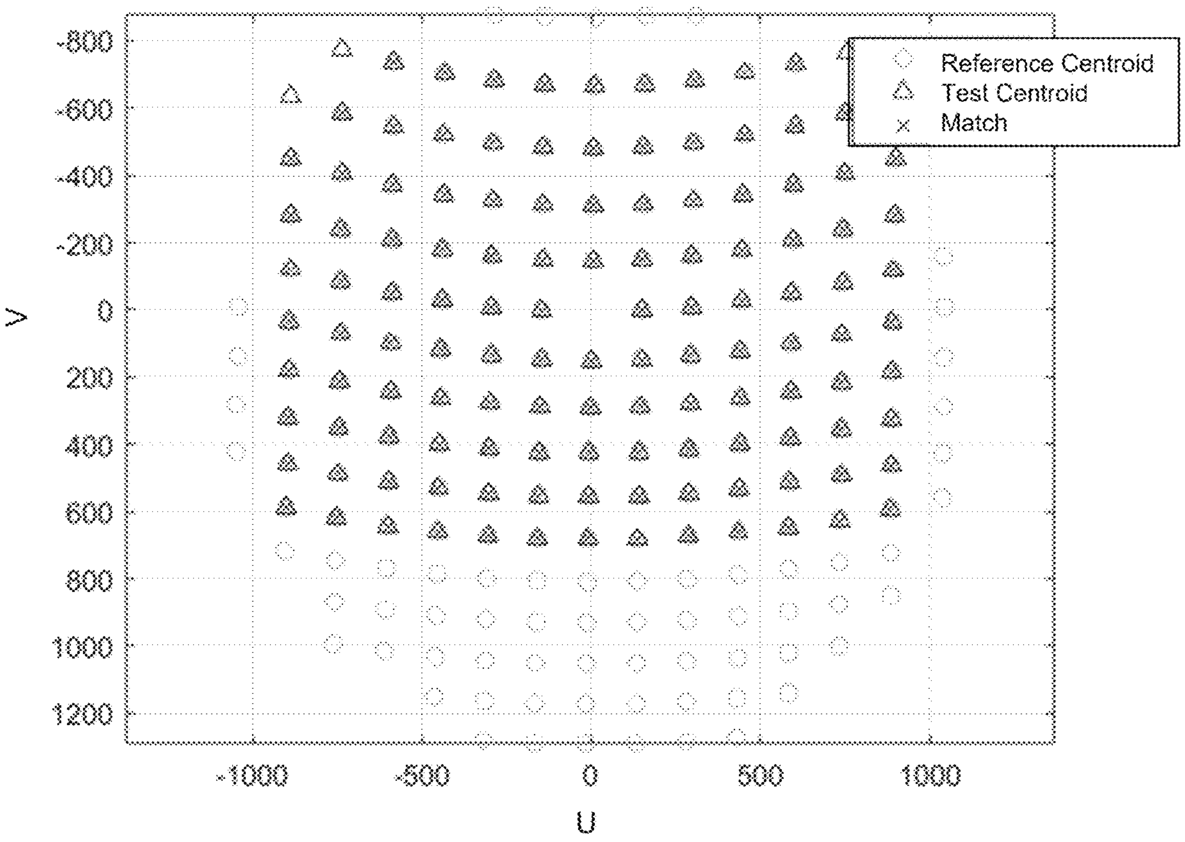
FIG. 11 is an illustration depicting an example of sets of paired centroids, according to an implementation.

At 708, the process 700 pairs the corrected reference centroids with test centroids to generate sets of paired centroids (also sometimes referred to as sets of matched centroids). For example, the process 700 may determine the distances between the test centroids and the corrected reference centroids and determine pairs that minimize the distances. The center centroid of the test image and the center centroid of reference image may be used as a reference when pairing. In one example, the test centroids are scaled by a polynomial to minimize the residuals between the indices of the paired centroids. FIG. 11 is an illustration depicting an example of sets of paired centroids, according to an implementation. At 708, the test centroids of the center box in the test image may be paired to reference centroids of a center box in the reference image.

Figure 12:
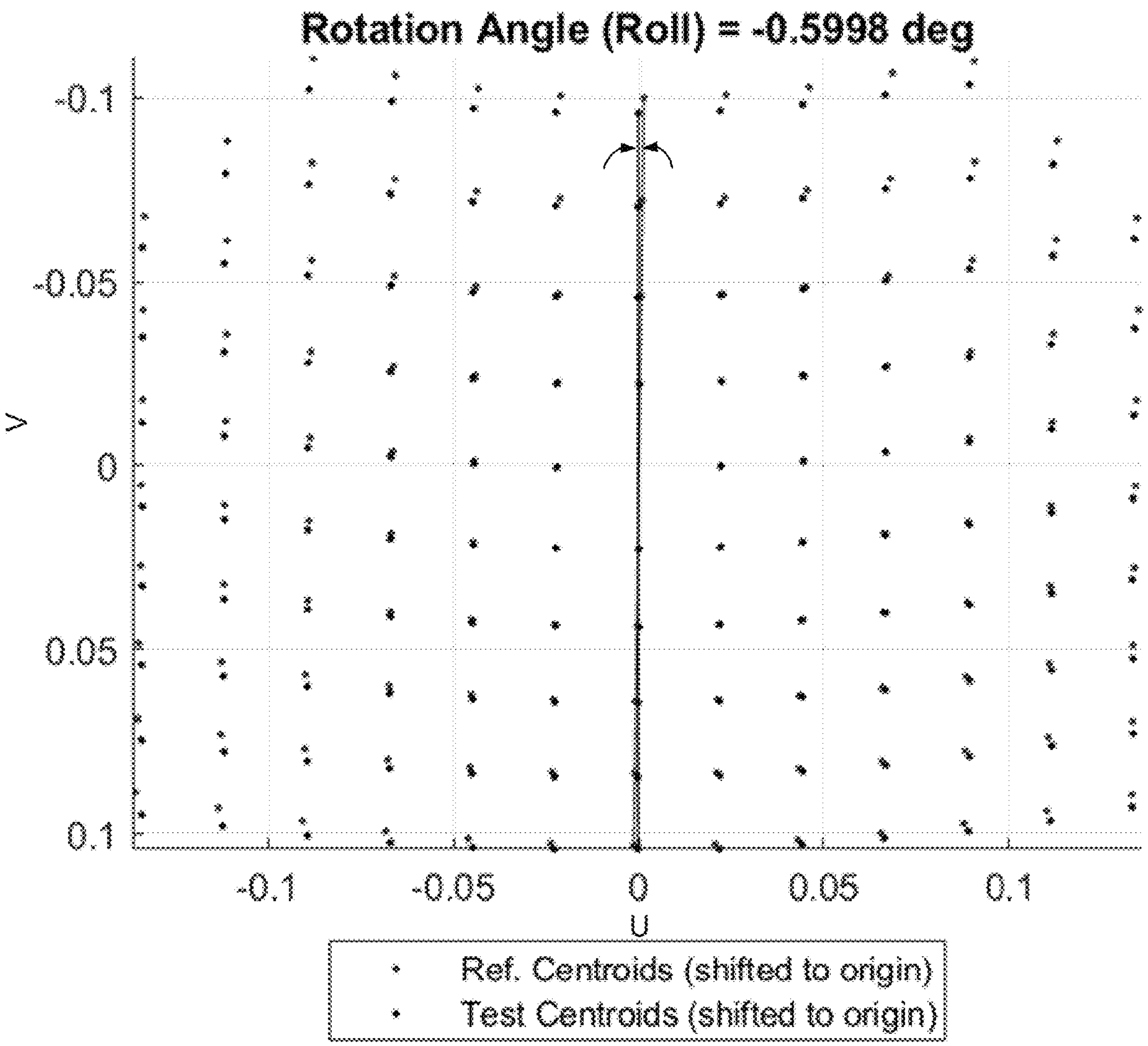
FIG. 12 is a plot of an example of reference centroids and test centroids where the roll angle of the test camera has been determined to be −0.5998 degrees, according to one implementation.

At 710, the process 700 determines a roll angle for test camera based on the relative rotation of between the corrected reference centroids and the raw test centroids of the center boxes. FIG. 12 is a plot of an example of reference centroids and test centroids where the roll angle of the test camera has been determined to be −0.5998 degrees, according to one implementation.

At 712, the process 700 shifts/rotates the raw (uncorrected) reference centroids of the center box in the reference image to align with the paired test centroids of the center box of the test image to determine scaling and distortion. Center box shifting can be used to account for any extrinsic misalignment when determining intrinsic parameters of the test camera. Determination of the extrinsic parameters (e.g., roll angle, pitch angle, and yaw angle) of the test camera is based on the raw (unshifted) reference centroids. After aligning (through shifting and/or rotating) the center box of the reference centroids with the center box of the test centroids, the intrinsic parameters are determined by comparing the relative locations of the test and reference centroids in the center boxes. For example, each set of paired centroids may be converted into test camera pixel space (e.g., sometimes referred to herein as UV space) using the intrinsic calibration parameters of the reference camera. The intrinsic parameters (e.g., focal length, distortion coefficients ($k_1$, $k_2$, $k_3$, $p_1$, $p_2$) and principal point coordinates ($P_r$, $P_t$)) may be determined by minimizing a function with these intrinsic calibration parameters.

Figure 13:
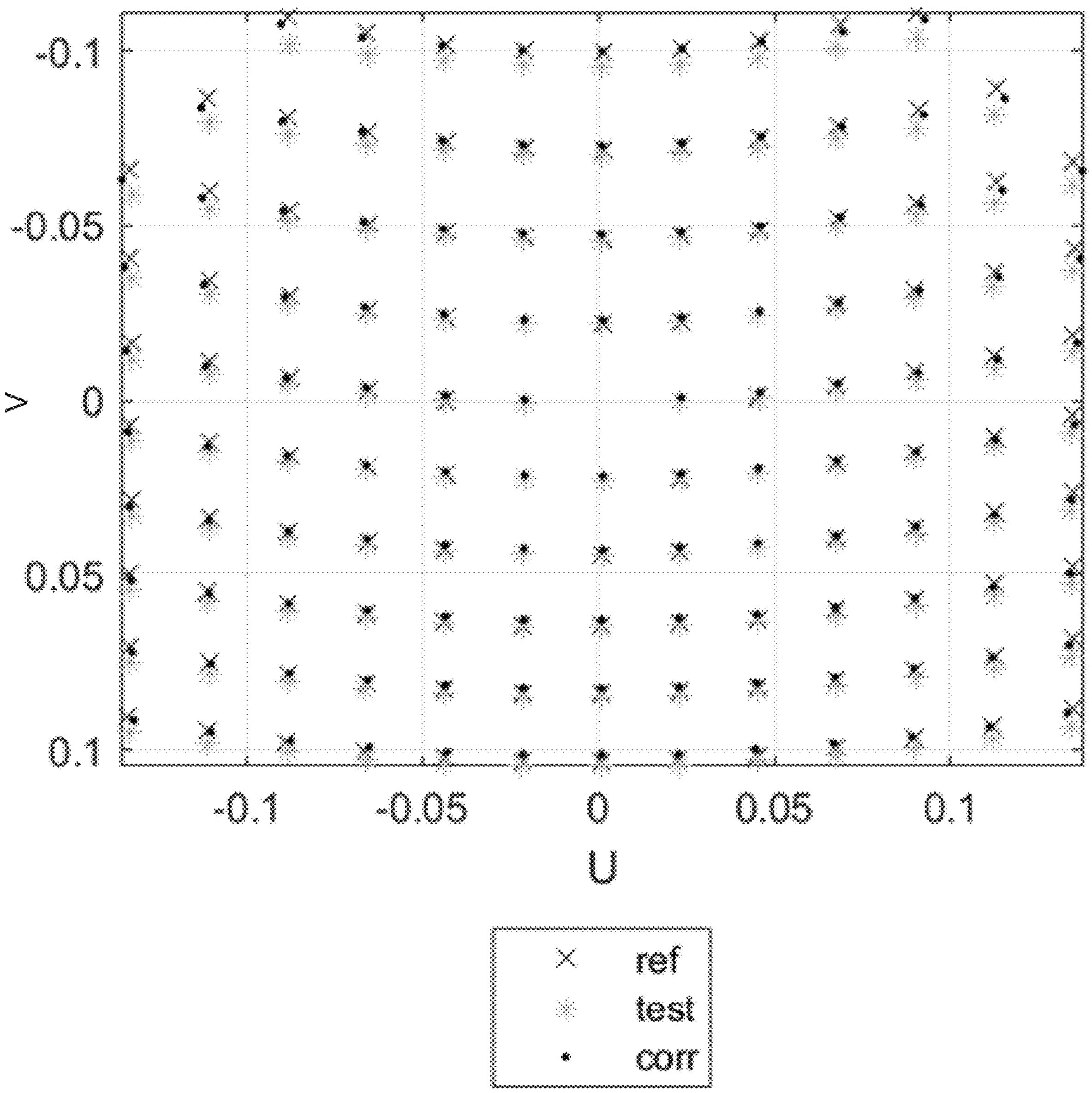
FIG. 13 is a plot of an example of reference centroids, test centroids, and corrected test centroids, according to one implementation.

At 714, the process 700 corrects the test centroids using the one or more intrinsic calibration parameters of the test camera. FIG. 13 is a plot of an example of reference centroids, test centroids, and corrected test centroids, according to one implementation.

Figure 14A:
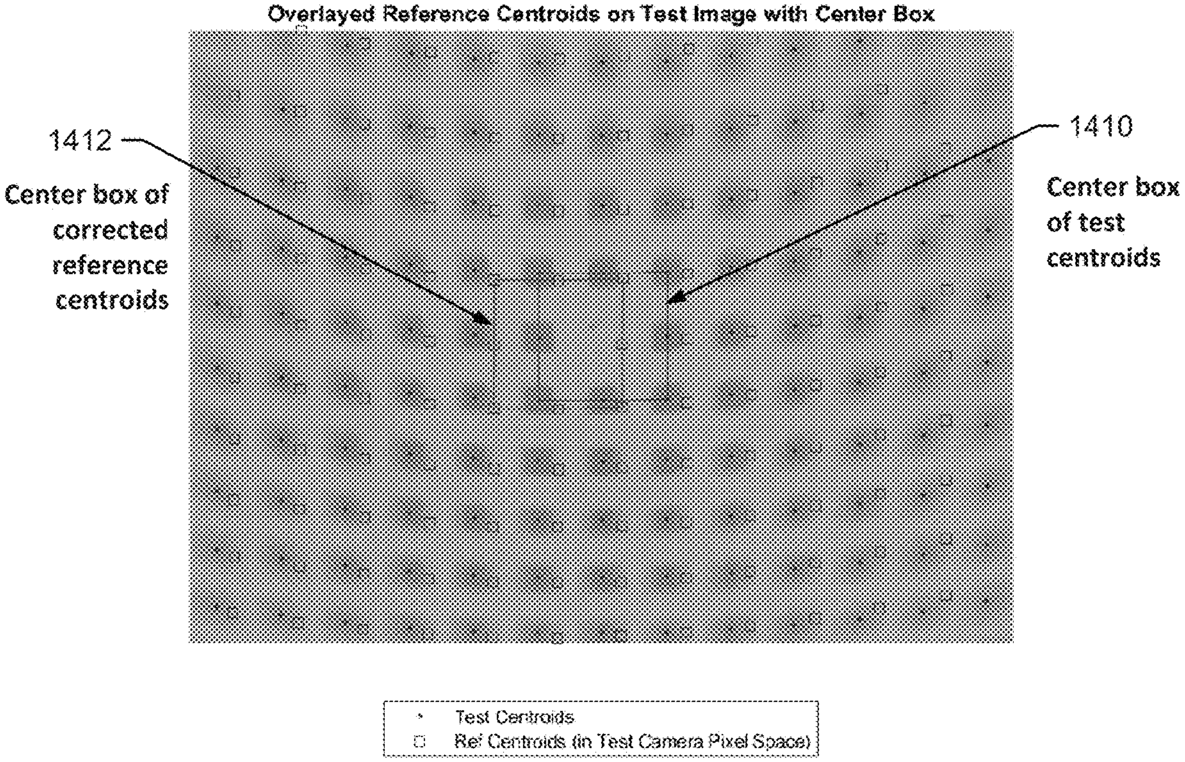
FIG. 14A is an illustration of an example of corrected reference centroids overlayed on a test image in test camera pixel space according to one implementation.
Figure 14B:
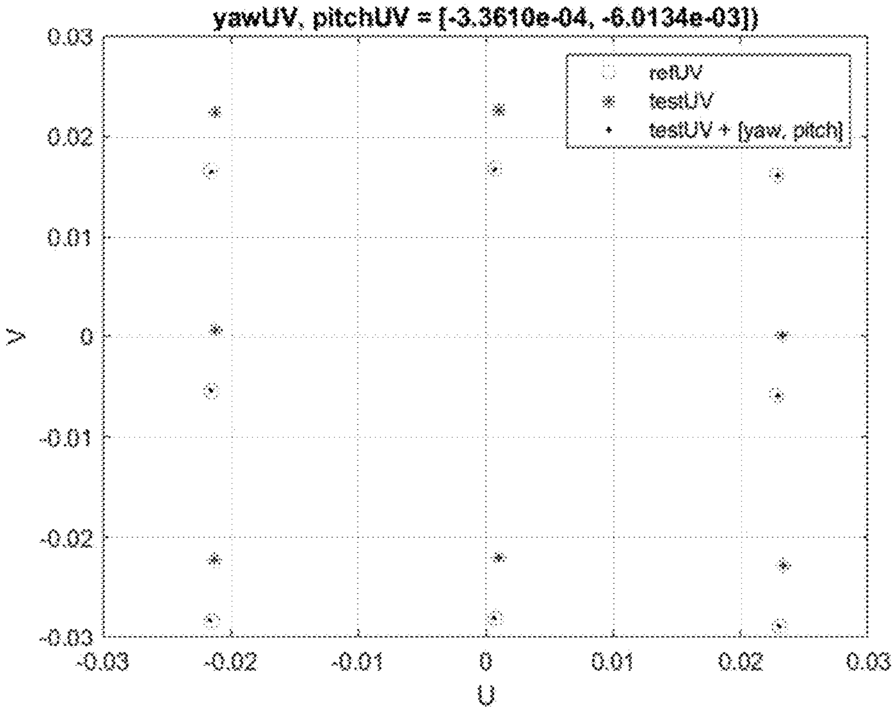
FIG. 14B is a plot of the coordinates in camera pixel space of the center box of corrected test centroids and the center box of corrected reference centroids according to one implementation.

At 716, the process 700 determines a pitch angle and a yaw angle of the test camera based on coordinates in camera pixel space of the corrected reference centroids and the corrected test centroids of the surrounding pattern regions of the center boxes. The coordinates in camera pixel space of the corrected reference centroids and the corrected test centroids may be compared to determine pitch and yaw angles of the test camera. FIG. 14A is an illustration of an example of corrected reference centroids overlayed on a test image in test camera pixel space according to one implementation. The illustration depicts a center box of corrected test centroids 1410 and a center box of corrected reference centroids 1412. FIG. 14B is a plot of the coordinates in camera pixel space of the center box of corrected test centroids 1410 and the center box of corrected reference centroids 1412. The pitch and yaw angles can be determined from the differences in the U and V coordinates between paired corrected test and reference centroids.

In conclusion, techniques discussed herein can accurately calibrate test cameras having focus distances of 100 meters or more using a conventionally-sized checkboard pattern in a standard laboratory setting or other relatively small space. These techniques can be used to calibrate cameras across various wavelengths including visible light and infrared cameras. These techniques can provide accurate calibration parameters that enable calibrated cameras to generate pose estimates within 5% error of ground truth.

Figure 15:
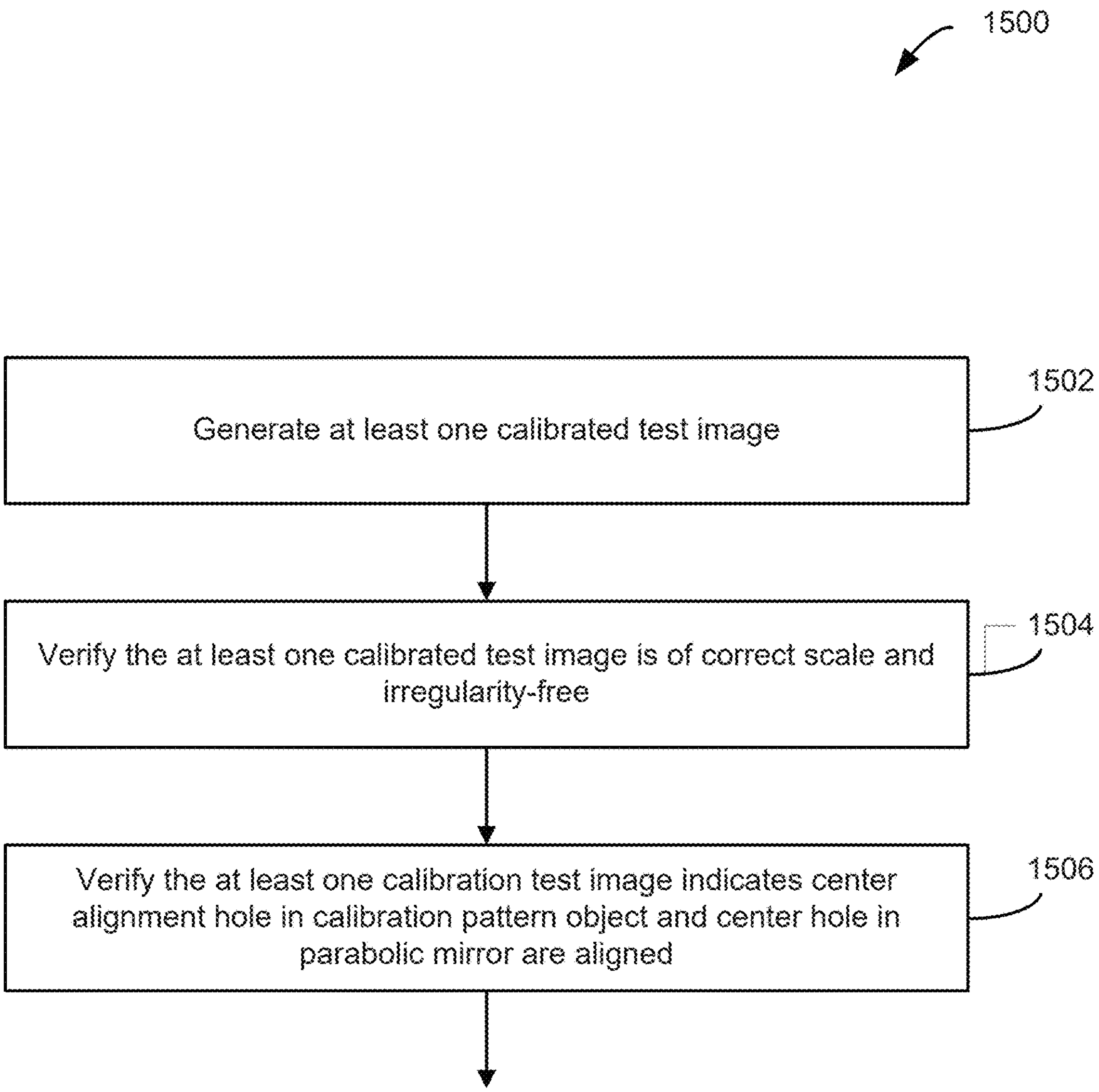
FIG. 15 is a flowchart depicting an example process for calibrating a test camera in accordance with some embodiments.

FIG. 15 is a flowchart depicting an example process 1500 for validating a calibrated test camera, in accordance with some embodiments. For example, test camera 140 in FIG. 1 or test camera 340 in FIG. 3 can be calibrated by intrinsic and extrinsic parameters determine by one or more calibration techniques described herein and example process 1500 may be used to validate and/or assess the calibrated test camera. Certain blocks of the process 1500 may be executed by one or more processors of one or more computing devices. Some examples of such computing devices include the computing device 190 shown in and described above in connection with FIG. 1 and the computing device described below in connection with FIG. 16. In some implementations, blocks of process 1500 may be executed in an order other than what is shown in FIG. 15. In some embodiments, one or more blocks of process 1500 may be omitted, and/or two or more blocks may be executed substantially in parallel.

Process 1500 can begin at 1502 by generating at least one calibrated test image using the calibrated test camera. For example, control signals may be sent to the calibrated test camera to capture one or more test image during exposure period(s).

At 1504, process 1500 verifies that the at least one calibrated test image is of correct scale and irregularity free. In one example, the process may determine that the at least one calibrated test image is free of one or more of a bad or corrupted pixel, a smear or unexpected spot, an obstruction in a field-of-view, and any other irregularity.

At 1506, process 1500 verifies that the center pattern alignment hole in the patterned object (e.g., alignment hole 12 in calibration pattern object 10 in FIG. 1) and the mirror hole in the parabolic mirror (e.g., mirror hole 151 in parabolic mirror 150 in FIG. 1) are aligned in the at least one calibrated test image. For example, the at least one calibrated image may be examined to verify that there is a single dark spot. As another example, if a test image includes two dark spots, the process may determine that the two dark spots are substantially aligned.

Figure 16:
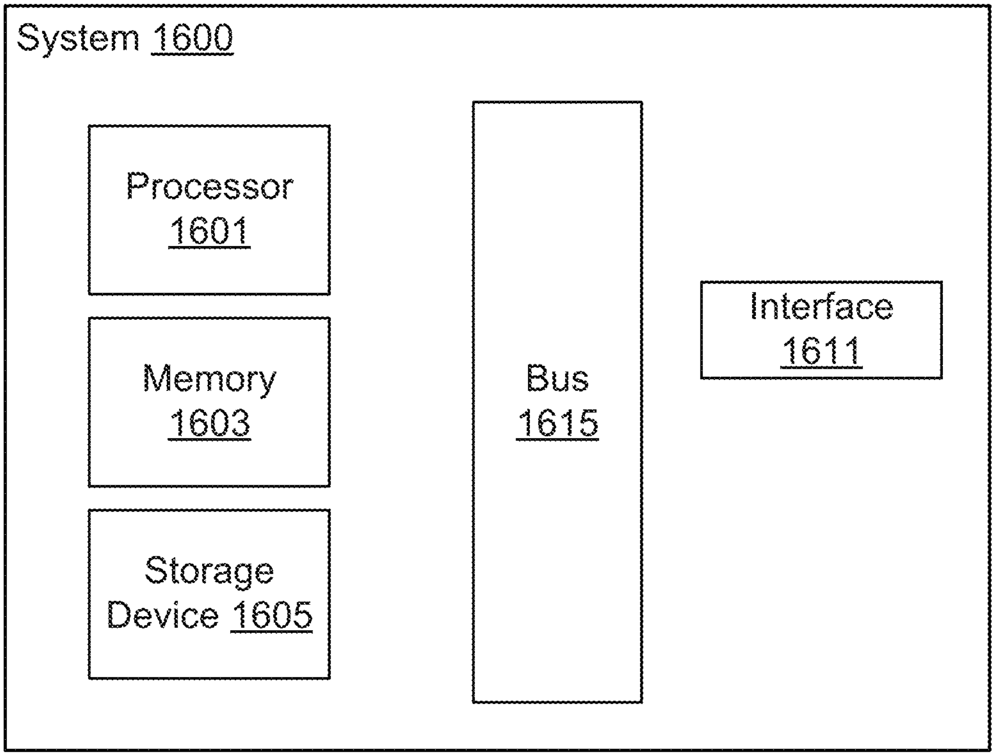
FIG. 16 illustrates a block diagram of one example of components of a system of a computing device, in accordance with some embodiments.

FIG. 16 illustrates a block diagram of one example of components of a system 1600 of a computing device, in accordance with some embodiments. The system 1600 suitable for implementing various embodiments described herein includes a processor 1601, a memory 1603, a storage device 1605, an interface 1611, and a bus 1615 (e.g., a PCI bus or other interconnection fabric). Although a particular configuration is described, a variety of alternative configurations are possible. Processor 1601 may perform operations such as those described herein. Instructions for performing such operations may be embodied in memory 1603, on one or more non-transitory computer readable media, or on some other storage device. Various specially configured devices can also be used in place of or in addition to processor 1601. Memory 1603 may be random access memory (RAM) or other dynamic storage devices. Storage device 1605 may include a non-transitory computer-readable storage medium holding information, instructions, or some combination thereof, for example instructions that when executed by the processor 1601, cause processor 1601 to be configured or operable to perform one or more operations of a method as described herein. Bus 1615 or other communication components may support communication of information within system 1600. The interface 1611 may be connected to bus 1615 and be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. System 1600 may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by non-transitory computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of non-transitory computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A non-transitory computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A system for calibrating a first camera, the system comprising:
- at least one laser source configured to emit a light beam;
- an alignment cube coupled to the first camera, the alignment cube comprising a reflective surface with a normal vector, wherein a line of sight of a reference camera is parallel to the normal vector of the alignment cube;
- a parabolic mirror configured to reflect light from a calibration pattern object being imaged to the first camera;
- an optical system configured to propagate a first portion of the light beam from the at least one laser source to a calibration pattern object being imaged and a second portion of the light beam to the reflective surface of the alignment cube; and
- one or more processors configured to:
  - cause the first camera to capture a test image of the calibration pattern object based on light reflected by the parabolic mirror; and
  - determine one or more intrinsic calibration parameters and one or more extrinsic calibration parameters of the first camera based on the test image and a reference image captured by the reference camera.

2. The system of claim 1, wherein the first camera is a visible light camera or an infrared light camera.

3. The system of claim 1, wherein the first camera is configured to capture the test image based on detected light in a visible wavelength range, a near infrared wavelength range, a middle wavelength infrared range, a long wavelength infrared range, or a ultraviolet wavelength range.

4. The system of claim 1, wherein the parabolic mirror comprises a center hole configured to transmit the first portion of the light beam.

5. The system of claim 1, wherein the calibration pattern object comprises:

a frontside surface oriented parallel to the normal vector at the reflective surface of the alignment cube; and/or an alignment hole at or near a center of the calibration pattern object, the alignment hole configured to orient the calibration pattern object to be centered on the mirror hole in the parabolic mirror in an image plane.

6. The system of claim 1, wherein:

the one or more intrinsic calibration parameters comprise a focal length, coordinates of a principal point, and/or one or more distortion coefficients of the first camera; and/or the one or more extrinsic calibration parameters comprise a yaw angle, a pitch angle, and a roll angle of the first camera.

7. The system of claim 1, further comprising:

a heater thermally coupled to the calibration pattern object; and an optical aperture in an optical path between the first camera and the parabolic mirror, wherein the first camera is an infrared camera.

8. The system of claim 1, further comprising a translation mechanism configured to translate the calibration pattern object to a predefined distance from the parabolic mirror, the predefined distance corresponding to a focal distance.

9. A method for calibrating a first camera, the method comprising:

(a) causing the first camera to capture a test image of a calibration pattern object, the test image based on light reflected by a parabolic mirror; and (b) determining one or more intrinsic calibration parameters and one or more extrinsic calibration parameters of the first camera based on the test image and a reference image captured by a reference camera having a line of sight parallel to a reference vector normal to a reflective surface of an alignment cube coupled to the first camera.

10. The method of claim 9, wherein the test image is based on detected light in a visible wavelength range, a near infrared wavelength range, a middle wavelength infrared range, or a long wavelength infrared range.

11. The method of claim 9, wherein:

the one or more intrinsic calibration parameters comprise a focal length, coordinates of a principal point, and/or one or more distortion coefficients of the first camera; and/or the one or more extrinsic calibration parameters comprise a yaw angle, a pitch angle, and a roll angle of the first camera.

12. The method of claim 9, further comprising:

causing at least one laser source to emit a light beam, wherein a first portion of the light beam propagates to the calibration pattern object and a second portion of the light beam propagates to a reflective surface of the alignment cube; and aligning the calibration pattern object and/or the alignment cube to be perpendicular to a reference plane based on the first portion of the light beam and the second portion of the light beam.

13. The method of claim 9, wherein (b) comprises:

determining a test centroid for each of a plurality of test pattern regions extracted from the test image;

pairing each test centroid with a reference centroid of a plurality of reference pattern regions extracted from the reference image to generate pairs of test centroids and reference centroids;

shifting and rotating the reference centroids to align the pairs of test centroids and reference centroids;

determining the one or more intrinsic calibration parameters based on relative locations of the test centroids and the shifted and rotated reference centroids;

correcting the test centroids using the one or more intrinsic calibration parameters; and determining a pitch angle and a yaw angle of the first camera based on relative locations of the corrected test centroids and the reference centroids.

14. The method of claim 9, wherein (b) comprises:

determining a test centroid for each of a plurality of test pattern regions extracted from the test image;

determining a reference centroid for each of a plurality of reference pattern regions extracted from the reference image; and determining a pitch angle, a yaw angle and/or a roll angle of the first camera based on relative rotation between the test centroids and the reference centroids.

15. The method of claim 14, wherein (b) comprises determining location of an optical center of the first camera based on a relative translation between the test centroids and the reference centroids.

16. The method of claim 9, further comprising validating the one or more intrinsic calibration parameters and the one or more extrinsic calibration parameters by:

(i) generating at least one calibrated test image based on the one or more intrinsic calibration parameters and the one or more extrinsic calibration parameters;

(ii) verifying the at least one calibrated test image is of correct scale and irregularity free; and (iii) verifying the at least one calibrated test image includes one or more dark regions indicative of alignment between a center hole in the parabolic mirror and a center alignment hole in the calibration pattern object.

17. A non-transitory machine-readable medium comprising instructions that, when executed by one or more processors, are configured to cause the one or more processors to perform operations comprising:

(a) causing a first camera to capture a test image of a calibration pattern object, the test image based on light reflected by a parabolic mirror; and (b) determining one or more intrinsic calibration parameters and one or more extrinsic calibration parameters of the first camera based on the test image and a reference image captured by a reference camera having a line of sight parallel to a vector normal to a reflective surface of an alignment cube coupled to the first camera.

18. The non-transitory machine-readable medium of claim 17, wherein:

the one or more intrinsic calibration parameters comprise a focal length, coordinates of a principal point, and/or one or more distortion coefficients of the first camera; and/or the one or more extrinsic calibration parameters comprise a yaw angle, a pitch angle, and a roll angle of the first camera.

19. The non-transitory machine-readable medium of claim 17, wherein the operations further comprise:

causing at least one least one laser source to emit a light beam, wherein a first portion of the light beam propagates to the calibration pattern object and a second portion of the light beam propagates to a reflective surface of the alignment cube; and aligning the calibration pattern object and/or the alignment cube to be perpendicular to a reference plane based on the first portion of the light beam and the second portion of the light beam.

20. The non-transitory machine-readable medium of claim 17, wherein (b) comprises:

determining a test centroid for each of a plurality of test pattern regions extracted from the test image;

pairing each of the test centroids with a reference centroid of a plurality of reference pattern regions extracted from the reference image to generate pairs of test centroids and reference centroids;

shifting and rotating the reference centroids to align the pairs of test centroids and reference centroids;

determining the one or more intrinsic calibration parameters based on relative locations of the test centroids and the shifted and rotated reference centroids;

correcting the test centroids using the determined one or more intrinsic calibration parameters; and determining a pitch angle and a yaw angle of the first camera based on relative locations of the corrected test centroids and the reference centroids.

* * * * *